(12) United States Patent
Nakazawa et al.

(10) Patent No.: US 8,117,437 B2
(45) Date of Patent: Feb. 14, 2012

(54) SYSTEM FOR PROVIDING SERVICES FOR APPLICATIONS AVAILABLE UNDER DIFFERENT PROTOCOLS

(75) Inventors: Osamu Nakazawa, Tokyo (JP); Shinichi Otokawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1173 days.

(21) Appl. No.: 10/976,041

(22) Filed: Oct. 29, 2004

(65) Prior Publication Data

US 2005/0097367 A1    May 5, 2005

(30) Foreign Application Priority Data

Oct. 31, 2003  (JP) .................................. 2003-371450
Oct. 4, 2004   (JP) .................................. 2004-291716

(51) Int. Cl.
*H04L 29/06* (2006.01)
(52) U.S. Cl. ........................................................ 713/151
(58) Field of Classification Search .................... 713/151
See application file for complete search history.

(56) References Cited

U.S. PATENT DOCUMENTS

| 6,785,730 | B1* | 8/2004 | Taylor ............................ 709/230 |
| 2002/0101879 | A1 | 8/2002 | Bouret et al. |
| 2002/0131395 | A1* | 9/2002 | Wang ............................. 370/349 |
| 2002/0147818 | A1 | 10/2002 | Wengrovitz |
| 2003/0069922 | A1 | 4/2003 | Arunachalam |
| 2003/0079020 | A1 | 4/2003 | Gourraud et al. |
| 2003/0125021 | A1 | 7/2003 | Tell et al. |
| 2003/0126196 | A1 | 7/2003 | Lagimonier et al. |
| 2003/0137991 | A1 | 7/2003 | Doshi et al. |
| 2004/0199828 | A1* | 10/2004 | Cabezas et al. ................. 714/39 |

FOREIGN PATENT DOCUMENTS

JP    2004-247916 A    9/2004

OTHER PUBLICATIONS http://jakarta.apache.org/tomcat/tomcat-5.0-doc/servletapi/index.html, (1 page).
http://www.jcp.org/aboutJava/communityprocess/final/jsr053/, (2 pages).
U.S. Appl. No. 10/921,343, filed Aug. 19, 2004, titled "Service Providing System Allowing Flexible Cooperation Between Applications Exploiting Different Protocols"; by Osamu Nakazawa and Haruo Fukuda.

(Continued)

*Primary Examiner* — Nasser Moazzami
*Assistant Examiner* — Daniel Hoang
(74) *Attorney, Agent, or Firm* — Venable LLP; Michael A. Sartori; Todd R. Farnsworth

(57) ABSTRACT

In a service providing system, a plurality of application users can work together in real time, and an application can be created which can handle a plurality of protocols. In the system where the web-AP and SIP server environments are cooperative with each other, a web-AP execution server executing a web application associated with a web context is connected to a web context manager managing a context of the HTTP protocol. A SIP-AP execution server is connected to a SIP context manager managing a context of the SIP protocol for executing a SIP application associated with a SIP context related to a web context. A handler manager passing a message between HTTP and SIP handlers is connected to the web-AP execution server. The web and SIP context managers have cooperation managers working together.

16 Claims, 20 Drawing Sheets

OTHER PUBLICATIONS

Chinese Office Action dated Oct. 24, 2008, issued in Chinese Patent Application No. 200410089698.5.
Internet Engineering Task Force (IETF) Network Working Group: "SIP" Session Initiation Protocol, Jun. 2002, pp. 1-269.
"Hypertext Transfer Protocol/1.1-HTTP/1.1," Internet Engineering Task Force (IETF) Network Working Group; Jan. 1997, pp. 1-162.
Y. Chimura et al., "Session Initiation Protocol Textbook (SIP Textbook)" first edition; May 2, 2003; pp. 50-59.
The Production Guide: Product & Solution "Notable VoiP Solution," Computer & Network LAN, vol. 21, No. 6, pp. 86-87, Jun. 1, 2003, Ohmsha, Japan.
"Web Based Middleware for Integrating Home Appliances," Daiki UNEO, Journal of Information Processing, vol. 44, No. SIG10 (ACS2), pp. 177-186, Jul. 15, 2003, Information Processing Society of Japan.
Y. Yamashita et al., "A Service Control Method that Interworking with WWW System using SIP," Proceeding of the 2003 IEICE General Conference, Communication 2, Japan, The Institute of Electronics, Information and Communication Engineers, Mar. 3, 2003, p. 140.
Kristensen, Anders, "SIP Servlet API Version 1.0," Dynamicsoft, Inc., Feb. 4, 2003, pp. 1-108.

* cited by examiner

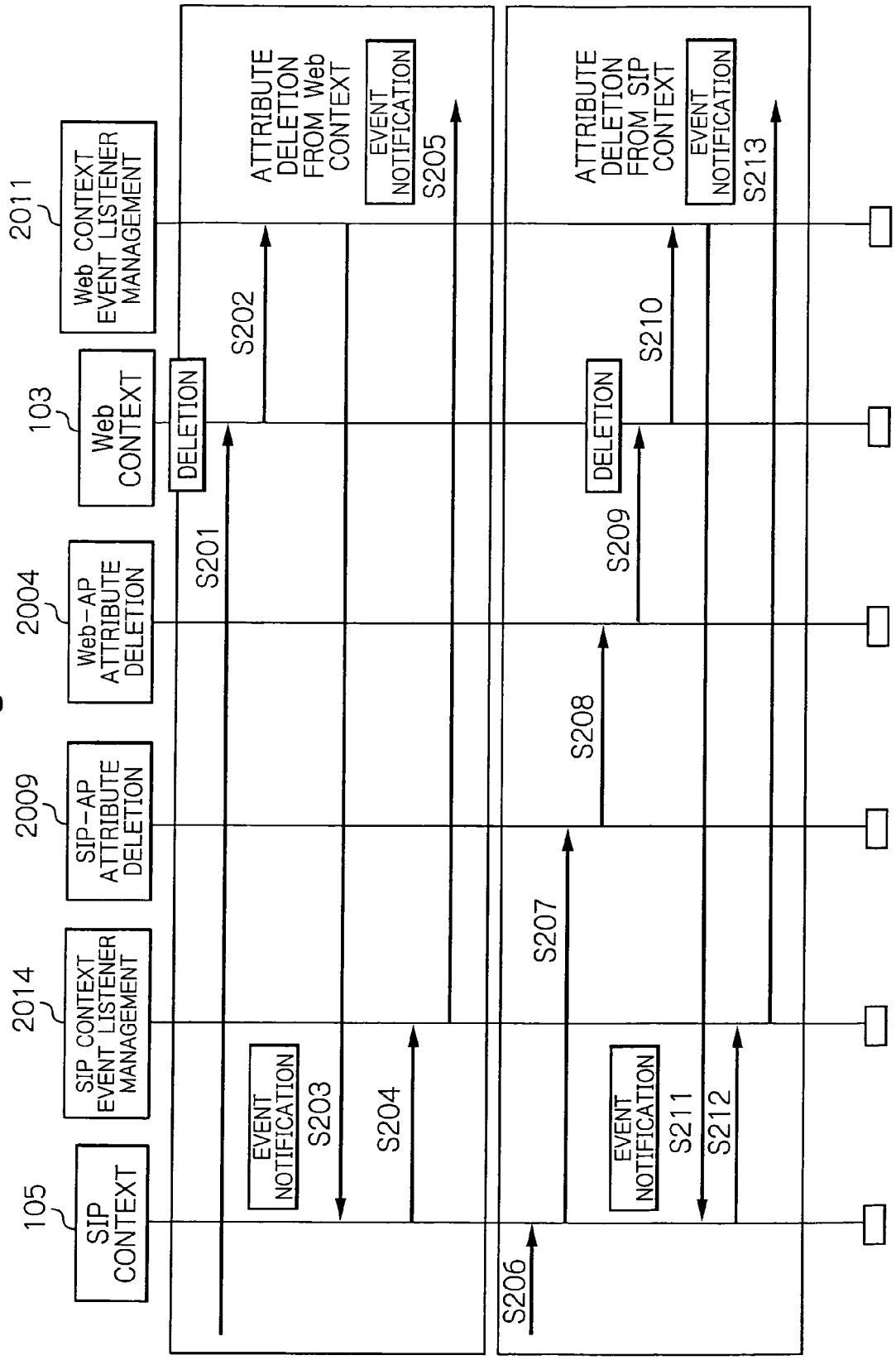

SYSTEM FOR PROVIDING SERVICES FOR APPLICATIONS AVAILABLE UNDER DIFFERENT PROTOCOLS

BACKGROUND OF THE INVENTION

1. Field of the Invention

The present invention relates to a service providing system. More specifically, the invention relates to a service providing system advantageously applicable to, for example, a web-VoIP (Voice over Internet Protocol) cooperative type of application software (AP) environment in which the web-AP server environment providing application software running in the WWW (World Wide Web) environment is cooperative with the SIP (Session Initiation Protocol) server environment, which is a VoIP server environment implemented by the SIP, that is one of the typical protocols for implementing VoIP.

2. Description of the Background Art

Recently, between a web server providing a web client with a service using the HTTP (Hyper Text Transfer Protocol) protocol and a web application (web-AP), a web-AP server is disposed to allow the web server to simply function as directly transferring information with the web client. An application software environment, based on such a web-AP server, is dedicated to web applications designed for the HTTP protocol.

In the conventional environment described above, the operation proceeds as follows. First, a web browser, one of web clients, issues a request to the web server via the HTTP protocol (first step). Next, based on the received request, the web server requests the web-AP server to execute application processing (second step). Then, the web-AP server starts the web application responsive to the requested application processing and executes the desired application processing (third step). Finally, the web application transfers the execution result to the web-AP server, and the web server sends out the execution result to the web browser that issued the request (fourth step).

In order to build an application that allows a plurality of users to communicate with each other, it is necessary to implement application software adapted to pass the execution result of a web application requested by one user to another user. The application software is structured to allow a user who wants to retrieve the execution result of some other user to issue a request for it by means of his or her browser and executing the processing flow similar to the first through fourth steps described above. It can be said that one user may thus receive the execution result from the other user in an indirect manner.

The typical configuration of such a web-AP server is implemented usually by the HTTP Servlet container. Multiple web applications, which include Servlets, are placed in the HTTP Servlet container to execute a request received from the web server. A request from some other browser is processed based on the same mechanism. Therefore, the processing of making the processing result from a request by one user associative with a request by some other user is also usually executed in the Servlet.

For example, when a user accesses a web page to place an order for, a product according to the sequence of the first to fourth steps described above, the vendor who receives the order checks the order contents by a separate procedure according to the sequence like the first to fourth steps. The vendor checks the order contents at a time the vendor wants to do so. Therefore, the vendor does not know whether or not the order is placed until the vendor checks it.

A typical web application that implements the specifications for HTTP Servlet (No-Patent Document 1) is Tomcat (Non-Patent Document 2). However, even if Tomcat is applied, a plurality of users must work together indirectly as in the above situation; that is, one user issues a request and the other user retrieves the processing result for the request. For the HTTP Servlet, reference may be made to the web site, http://java.sun.com/products/servlet/. Also for the Tomcat, the web site, http://java.jakarta.apache.org/tomcat/ may be referenced.

However, such an indirect cooperation cannot establish peer-to-peer communications between web clients. More specifically, in the conventional web-AP server environment, it was difficult to create a real-time communication-type application requiring real-time update and cooperation. For example, it was difficult to create an application that allows a buyer and a vendor to work together in real time when an order is placed.

Another problem with the conventional web-AP server environment is that only the HTTP protocol can be processed. Therefore, other communication protocols cannot be handled in a general framework, and it is thus difficult to create an application where different multiple protocols are combined with each other. There is a need for a service providing system that allows a plurality of application users to work together in real time and that can handle multiple protocols.

SUMMARY OF THE INVENTION

It is an object of the present invention to provide a service providing system in which an application can be created that allows a plurality of application users to work together in real time and that handles multiple protocols.

To solve the above-stated problems, a service providing system in accordance with the present invention comprises a first context manager for managing a first context associated with a first protocol; a second context manager for managing a second context associated with a second protocol; a first application execution server connected to said first context manager for executing a first application associated with the first context; a second application execution server connected to said second context manager for executing a second application associated with the second context related to the first context; and a handler manager connected to said first application execution server for passing a message between handlers.

The service providing system in accordance with the present invention makes it possible to create an application that can handle first and second protocols and to create an application that allows a plurality of users to work together in real time.

In accordance with the present invention, the SIP-based SIP-AP server function can be integrated into the web-AP server environment such as Tomcat, WebLogic, and WebSphere.

BRIEF DESCRIPTION OF THE DRAWINGS

The objects and features of the present invention will become more apparent from consideration of the following detailed description taken in conjunction with the accompanying drawings in which:

FIG. 24 is a sequence diagram useful for understanding an exemplified operation executed when the attribute of a context is deleted in the embodiment.

DESCRIPTION OF THE PREFERRED EMBODIMENTS

With reference to the accompanying drawings, preferred embodiments of a service providing system according to the present invention will be described in detail. Those embodiments are directed to the systems where the SIP-based SIP-AP server function is integrated into the web-AP server environment such as Tomcat.

Figure 12:
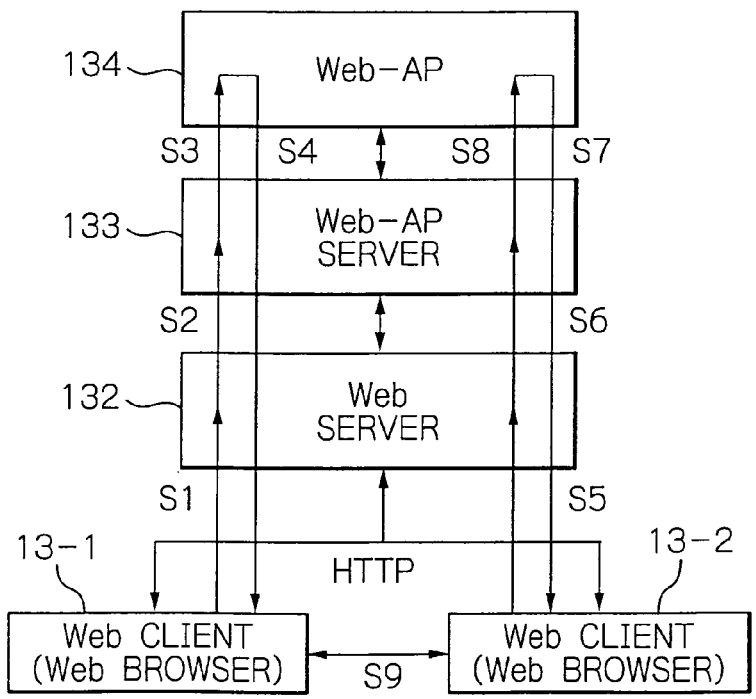
FIG. 12 schematically shows an example of an application execution environment to which the present invention is applied.

The system as shown in FIG. 12 generally comprises a web server 132 that provides a plurality of web clients 13-1 and 13-2 with a service via the HTTP protocol, a web application (web-AP) 134, and a web-AP server 133 placed between them. The web server 132 has the function of directly communicating with the web clients 13-1 and 13-2. Such an AP environment based on the web-AP server 133 is dedicated to web applications designed for the HTTP protocol.

In that system, the operation conventionally proceeds as follows. First, a web browser, which is the web client 13-1, issues a request to the web server 132 via the HTTP protocol (step S1). Next, based on the received request, the web server 132 requests the web-AP server 133 to execute application processing (step S2). Then, the web-AP server 133 starts the web application 134 associated with the requested application processing and executes the desired application processing (step S3). The web application 134 forwards the execution result to the web-AP server 133, and the web server 133 sends out the execution result to the web browser 13-1 via the web server 132 (step S4).

Conventionally, the execution result of the web application 134, produced in response to a request from one web client 13-1, is passed to the other web client 13-2 in the fashion read as follows. Specifically, the other web browser 13-2 issues a request for retrieving the execution result, executes steps S5-S8 that are similar to steps S1-S4, and receives the execution result indirectly.

Figure 13:
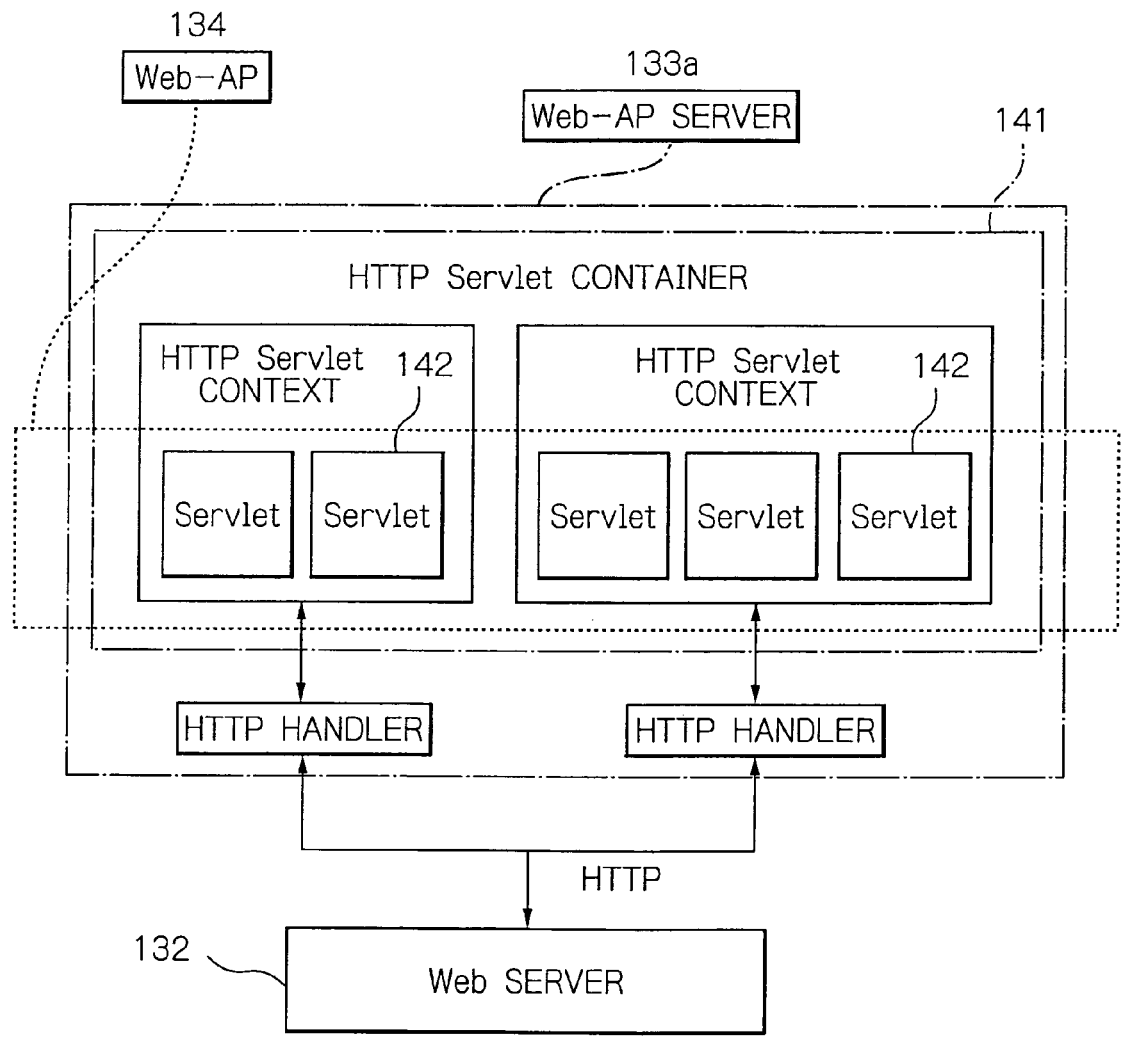
FIG. 13 is a schematic diagram useful for understanding a conventional application execution environment.

Conventionally, the web-AP server 133 described above is generally implemented by an HTTP Servlet container 141 that is shown in FIG. 13 as a web-AP server 133a. The HTTP Servlet container 141 includes the web application 134 that includes a plurality of Servlets 142 for executing a request received from the web server 132. A request sent from some other web browser, for example, the web client 13-2, is processed also based on the same mechanism. As described above, the processing in which the processing result from a request made by one web browser 13-1 operates with a request from the other web browser 13-2 in the web application 134 is generally performed in the web application 134.

With this web-AP server 133a, peer-to-peer communications as shown in step S9 cannot be carried out between the web clients 13-1s and 13-2.

Figure 1:
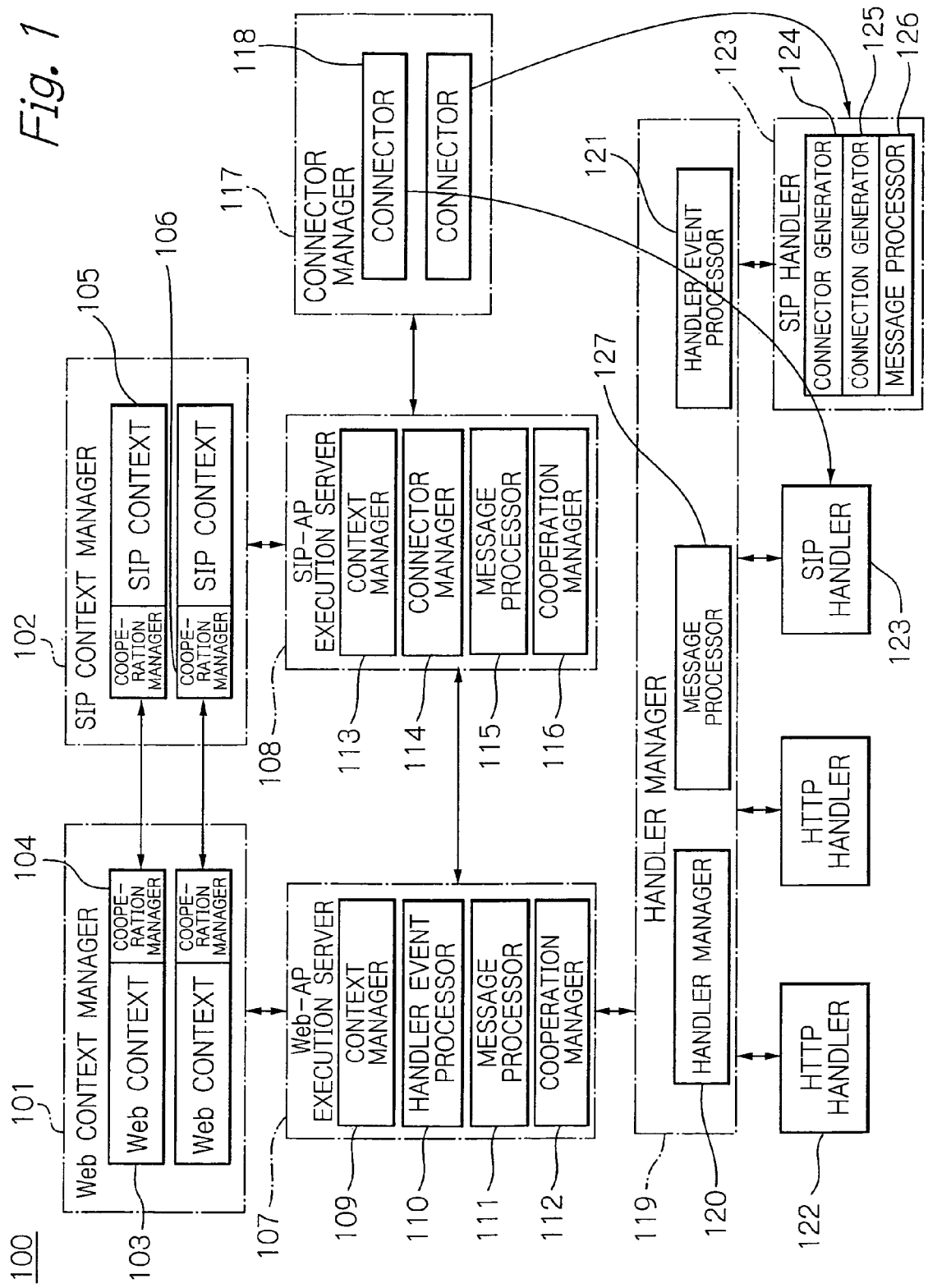
FIG. 1 is a schematic block diagram showing the functional configuration of a service providing system in accordance with a preferred embodiment of the present invention.

Referring now to FIG. 1, the embodiment of the service providing system 100 is in place of the web-AP server 133 shown in the system in FIG. 12. The service providing system 100 in the embodiment may be physically composed of one server or multiple servers.

As shown in the figure, the service providing system 100 in the embodiment generally comprises a web context manager 101, a SIP context manager 102, a web-AP execution server 107, a SIP-AP execution server 108, a connector manager 117, a handler manager 119, an HTTP handler 122, and a SIP handler 123.

The web context manager 101 is a component that manages one or more web contexts 103 executed on the web-AP execution server 107. Each web context 103 has a cooperation manager 104 that cooperates with the cooperation management of the corresponding SIP context 105.

The SIP context manager 102 is a component that manages one or more SIP contexts 105 executed in the environment of the SIP-AP execution server 108. The SIP-AP execution server 108 works with the web-AP execution server 107. Each SIP context 105 has a cooperation manager 106 that cooperates with the cooperation management of the corresponding web context 103.

The web context 103 is a component used by the web application 134 to communicate with the web-AP execution server 107. The web context 103 provides the interface function, such as writing of an execution log or distribution of requests, for example.

The cooperation manager 104 of the web context 103, that is a component provided for a web context to allow the web context 103 to work with the SIP context 105, mates with the cooperation manager 106 of the SIP context 105. The cooperation manager 104 of the web context 103 allows the SIP context 105 to operate on the information such as web-AP information managed by the web context 103. The cooperation manager 104 also provides the function of operating on the information of the web context 103 based on a request from the web application 134. The detailed functional configuration will be described later with reference to FIG. 2.

The SIP context 105 is a component used by a SIP application, not shown, to communicate with the SIP-AP execution server 108. The SIP context 105 provides the interface function, such as writing of an execution log or distribution of requests, for example.

The cooperation manager 106 of the SIP context 105, which is a component provided for a SIP context to allow the SIP context 105 to work with the web context 103, mates with the cooperation manager 104 of the web context 103. The cooperation manager 106 of the SIP context 105 provides the function of operating on the web-AP information managed by the web context 103. In addition, the cooperation manager 106 of the SIP context 105 allows the web context 103 to operate on the SIP-AP information managed by the SIP context 105. The detailed functional configuration will be described later with reference to FIG. 2.

The web-AP execution server 107 is in a server environment in which runs an application that operates on the web protocol, i.e. the HTTP protocol. As shown in the figure, the web-AP execution server 107 comprises a context manager 109, a handler event processor 110, a message processor 111, and a cooperation manager 112.

The context manager 109 is a component that communicates with the web context manager 101. The handler event processor 110 is a component that processes an event sent from a handler, not shown. The handler is a generic name for a mechanism for processing the HTTP and SIP protocols. The handler processes messages constituting the HTTP and SIP protocol and manages a communication connection with the AP server. The message processor 111 is a component that processes HTTP and SIP messages. The server environment cooperation manager 112 on the web application 134 side is a component provided for a web-AP for allowing the web-AP execution server 107 to work with the SIP-AP execution server 108. The server environment cooperation manager 112 mates with a server environment cooperation manager 116 on the SIP application side.

The SIP-AP execution server 108, a server environment in which an application operating on the SIP protocol runs, processes a SIP message and issues an IP message. The SIP-AP execution server 108 comprises a context manager 113, a connector manager 114, a message processor 115, and a cooperation manager 116, as shown in the figure.

The context manager 113 is a component that communicates with the SIP context manager 102. The connector manager 114 is a component that communicates with the connector manager 117. The message processor 115 is a component that processes a SIP message. The server environment cooperation manager 116 on the SIP application side is a component provided for a SIP application for allowing the web-AP execution server 107 to work with the SIP-AP execution server 108. The server environment cooperation manager 116 mates with a server environment cooperation manager 112 on the web application side.

The connector manager 117 is a component that manages one or more connectors 118. Each connector 118 is a component that sends out and receives a SIP message between the SIP-AP execution server 108 and its destination. There is a one-to-one correspondence between connectors 118 and SIP handlers 123.

The handler manager 119 is a component that passes a message from the HTTP handler 122 and the SIP handler 123 to the web-AP execution server 107. As shown in the figure, the handler manager 119 comprises a handler manager 120, a handler event processor 121 and a message processor 127.

The handler manager 120, which is a component that manages the HTTP handlers 122 and the SIP handlers 123, has the function of changes, such as addition or deletion, of an HTTP handler 122 and a SIP handler 123. The handler event processor 121 is a component that notifies an event, generated when an HTTP handler 122 or a SIP handler 123 is added or deleted, to the web-AP execution server 107. The message processor 127 is a component that transfers messages among an HTTP handler 122, a SIP handler 123, and the web-AP execution server 107.

The HTTP handler 122 is a component that receives a message via a web protocol, in this example, the HTTP protocol, and composes an HTTP message executed on the web-AP execution server 107.

The SIP handler 123 is a component that receives a message via the SIP protocol and composes a SIP message executed on the SIP-AP execution server 108. The SIP handler 123 is uniquely identified by SIP handler identification (ID) information. As shown in the figure, the SIP handler 123 comprises a connector generator 124, a connection generator 125, and a message processor 126.

The connector generator 124 is a component that generates a connector 118. The connection generator 125 is a module that generates a connection. The connection is used by a connector 118 to provide the function of actually sending out and receiving a SIP message according to a transport protocol such as the Transmission Control Protocol (TCP) or the User Datagram Protocol (UDP). The message processor 126 is a component that receives a message via a specific transport protocol and composes a SIP message.

Figure 2:
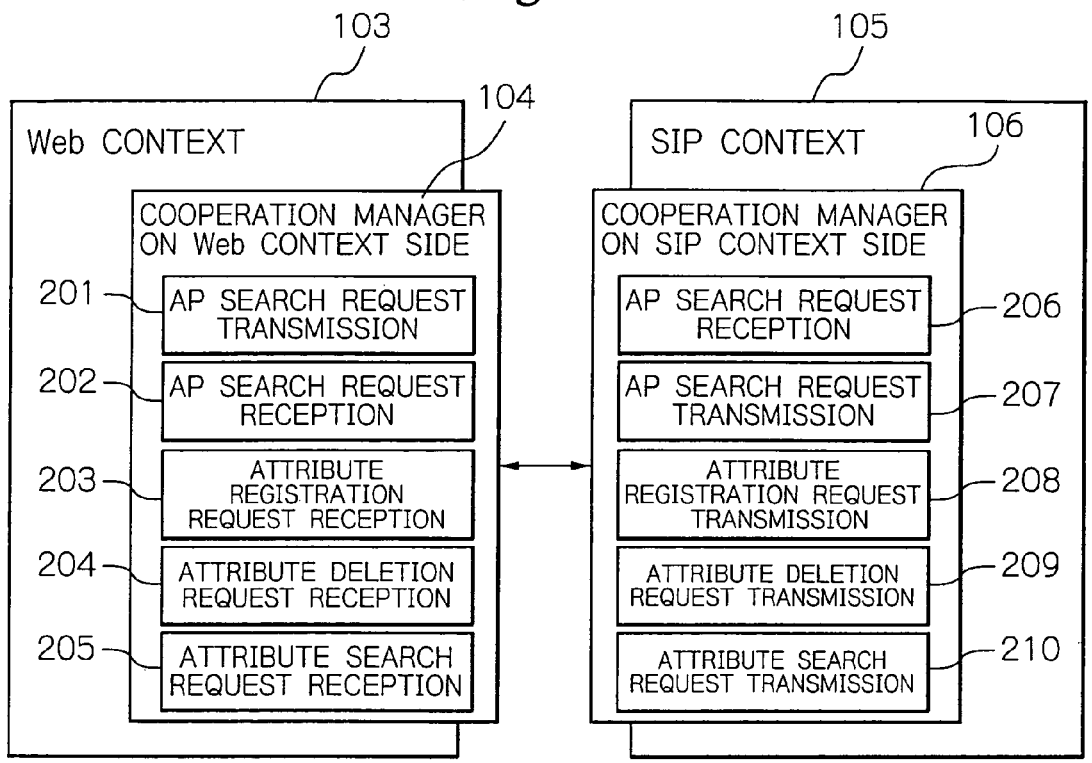
FIG. 2 is a schematic block diagram showing an example of the functional configuration of cooperation managers of a web context manager and a SIP context manager in the embodiment shown in FIG. 1.

Next, referring to FIG. 2, the configuration will be described of the cooperation manager 104 of the web context 103 side and the cooperation manager 106 of the SIP context 105 side. Those cooperation managers provide an environment in which the web application context and the SIP application context work together.

The cooperation manager 104 of the web context 103 is a component that allows the SIP context 105 to operate on the information, such as web-AP information, managed by the web context 103. The cooperation manager 104 is also used to operate on the information on the SIP context 105 side based on a request from a web application. As shown in the figure, the cooperation manager 104 of the web context 103 comprises an AP search request transmission module 201, an AP search request reception module 202, an attribute registration request reception module 203, an attribute deletion request reception module 204, and an attribute search request reception module 205.

The cooperation manager 106 of the SIP context 105 is a component that operates on the web-AP information managed by the web context 103. The cooperation manager 106 is also used to allow the web context 103 to operate on the SIP-AP information managed by the SIP context 105. As shown in the figure, the cooperation manager 106 of the SIP context 105 side comprises an AP search request reception module 206, an AP search request transmission module 207, an attribute registration request transmission module 208, an attribute deletion request transmission module 209, and an attribute search request transmission module 210.

The AP search request transmission module 201 searches for a SIP application managed by the SIP side. The AP search request reception module 206 searches for a web application managed by the webside. The AP search request reception module 206 mates with the AP search request transmission module 201.

The AP search request reception module 202 allows the SIP context side to search for a web application managed by the web side. The AP search request transmission module 207 allows the web context side to search for a SIP application managed by the SIP side. The AP search request transmission module 207 mates with the AP search request reception module 202.

The attribute registration request reception module 203 allows the SIP context side to register attribute information on a web application managed by the web side. The attribute registration request transmission module 208 registers attribute information on a web application managed by the web side. The attribute registration request transmission module 208 mates with the attribute registration request reception module 203.

The attribute deletion request reception module 204 allows the SIP context side to delete attribute information on a web application managed by the web side. The attribute deletion request transmission module 209 deletes attribute information on a web application managed by the web side. The attribute deletion request transmission module 209 mates with the attribute deletion request reception module 204.

The attribute search request reception module 205 allows the SIP context side to search for attribute information on a web application managed by the web side. The attribute search request transmission module 210 searches for attribute information on a web application managed by the web side. The attribute search request transmission module 210 mates with the attribute search request reception module 205.

In the configuration described above, all attribute information on an application is managed by the web side. It is also possible that the attribute information on an application is managed by the SIP side.

Figure 3:
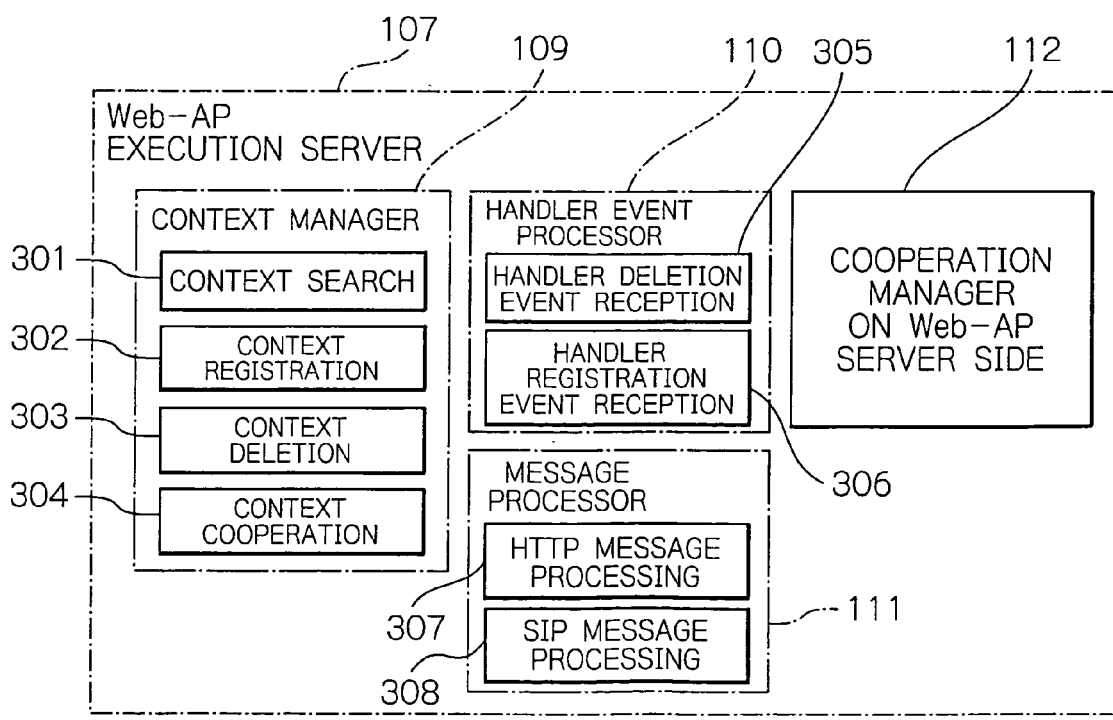
FIG. 3 is a schematic block diagram showing an example of the specific configuration of a web-AP execution server in the embodiment.

Next, referring to FIG. 3, the configuration of the web-AP execution server 107 will be described. As described above, the context manager 109 is a component that operates on a web context 103 held by the web context manager 101. As shown in the figure, the context manager 109 comprises a context search module 301, a context registration module 302, a context deletion module 303, and a context cooperation module 304. The context manager 109 is characterized specifically in that it has the context cooperation module 304.

The context search module 301 searches for a web context 103 registered with the web context manager 101, FIG. 1. The context registration module 302 registers a web context 103 with the web context manager 101. The context deletion module 303 deletes a web context 103 from the web context manager 101. The context cooperation module 304 issues a cooperation instruction that causes the web context 103 and the SIP context 105 to work together.

As described above, the handler event processor 110 is a component that receives an event notification of an operation on a HTTP handler 122 and an SIP handler 123 executed by the handler manager 119. As shown in the figure, the handler event processor 110 comprises a handler registration event reception module 306 and a handler deletion event reception module 305.

The handler registration event reception module 306 receives an event indicating that a handler is added to the handler manager 119. The handler deletion event reception module 305-receives an event indicating that a handler is deleted from the handler manager 119. As described above, the message processor 111, which is a component that processes a message received from an HTTP handler 122 and a SIP handler 123, comprises an HTTP message processing module 307 and a SIP message processing module 308. The HTTP message processing module 307 delivers an HTTP message to the web context 103 that executes an application. The SIP message processing module 308 delivers a SIP message to the SIP-AP execution server 108.

Figure 5:
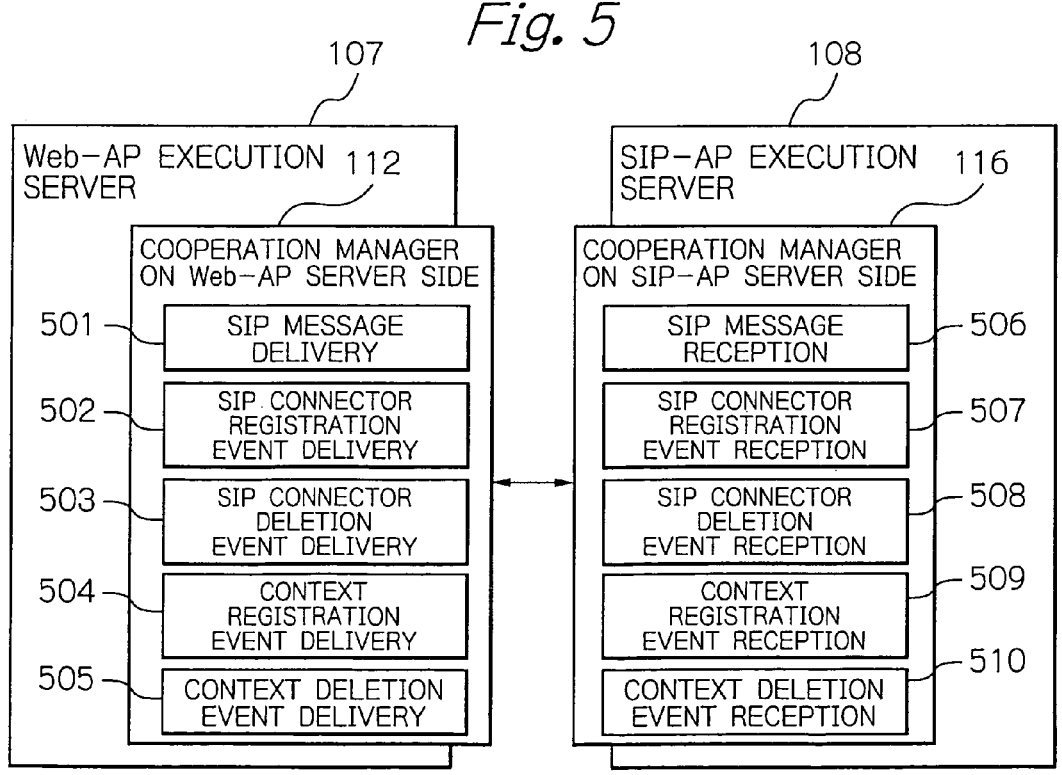
FIG. 5 is a schematic block diagram showing an example of the functional configuration of the cooperation managers of a web-AP execution server and a SIP-AP execution server in the embodiment.

The detailed configuration and the function of the cooperation manager 112, as well as the cooperation manager 116 of the SIP-AP execution server 108, will be described later on when FIG. 5 is referenced.

Prior to that, with reference to FIG. 4, the detailed configuration of the SIP-AP execution server 108 connected to the web-AP execution server 107 will be described.

As described above, the context manager 113 is a component that operates on the SIP context 105 held by the SIP context manager 102. As shown in the figure, the context manager 113 comprises a context search module 401, a context registration module 402, a context deletion module 403, and a web context cooperation module 404.

The context search module 401 searches for a SIP context 105 registered with the SIP context manager 102. The context registration module 402 registers a SIP context 105 with the SIP context manager 102. The context deletion module 403 deletes a SIP context 105 from the SIP context manager 102. The web context cooperation module 404 associates a SIP context 105 with a web context,103.

As described above, the connector manager 114 is a component that operates on a connector 118. As shown in the figure, the connector manager 114 comprises a connector search module 405, a connector registration module 406, a connector deletion module 407, and a message transmission module 408.

The connector search module 405 searches for a connector 118 registered with the connector manager 117. The connector registration module 406 registers a connector 118 with the connector manager 117. The connector deletion module 407 deletes a connector 118 from the connector manager 117. The message transmission module 408 delivers a SIP message to a connector 118.

As described above, the message processor 115 is a component that processes a SIP message. As shown in the figure, the message processor 115 comprises a SIP message reception module 409 and a SIP message transmission module 410.

The SIP message reception module 409 receives a SIP message from a connector 118 and delivers the received SIP message to a SIP context 105 that executes a target SIP application. The SIP message transmission module 410 delivers a SIP message, received from a SIP context 105, to a connector 118.

Next, the detailed configuration of the cooperation manager 112 of the web-AP execution server 107 and the cooperation manager 116 of the SIP-AP execution server 108 will be described. Those cooperation managers are management mechanisms for allowing the web application 134 and the SIP application to work together.

As described above, the cooperation manager 112 of the web-AP execution server 107 is a component that passes information, such as a SIP message about the SIP protocol and information on connector management that are notified to the web-AP execution server 107, to the SIP-AP execution server 108. As shown in the figure, this cooperation manager 112 comprises a SIP message delivery module 501, a SIP connector registration event delivery module 502, a SIP connect or deletion event delivery module 503, a context registration event delivery module 504, and a context deletion event delivery module 505.

As described above, the cooperation manager 116 of the SIP-AP execution server 108 is a component that receives information such as a SIP message about the SIP protocol and information on connector management that is notified to the web-AP execution server 107. As shown in the figure, this cooperation manager 116 comprises a SIP message reception module 506, a SIP connector registration event reception module 507, a SIP connector deletion event reception module 508, a context registration event reception module 509, and a context deletion event reception module 510.

The SIP message delivery module 501 delivers a SIP message, received by the web-AP execution server 107, to the SIP-AP execution server 108. The SIP message reception module 506 receives a SIP message received by the web-AP execution server 107.

The SIP connector registration event delivery module 502 notifies that a SIP connector 118 is registered. The SIP connector registration event reception module 507 receives a notification that a SIP connector 118 is registered.

The SIP connector deletion event delivery module 503 notifies that a SIP connector 118 is deleted. The SIP connector deletion event reception module 508 receives a notification that a SIP connector 118 is deleted.

The context registration event delivery module 504 is adapted for notifying that a SIP context 105 is registered. The context registration event reception module 509 receives a notification that a SIP context 105 is registered.

The context deletion event delivery module 505 notifies that a SIP context 105 is deleted. The context deletion event reception module 510 receives a notification that a SIP context 105 is deleted.

Figure 6:
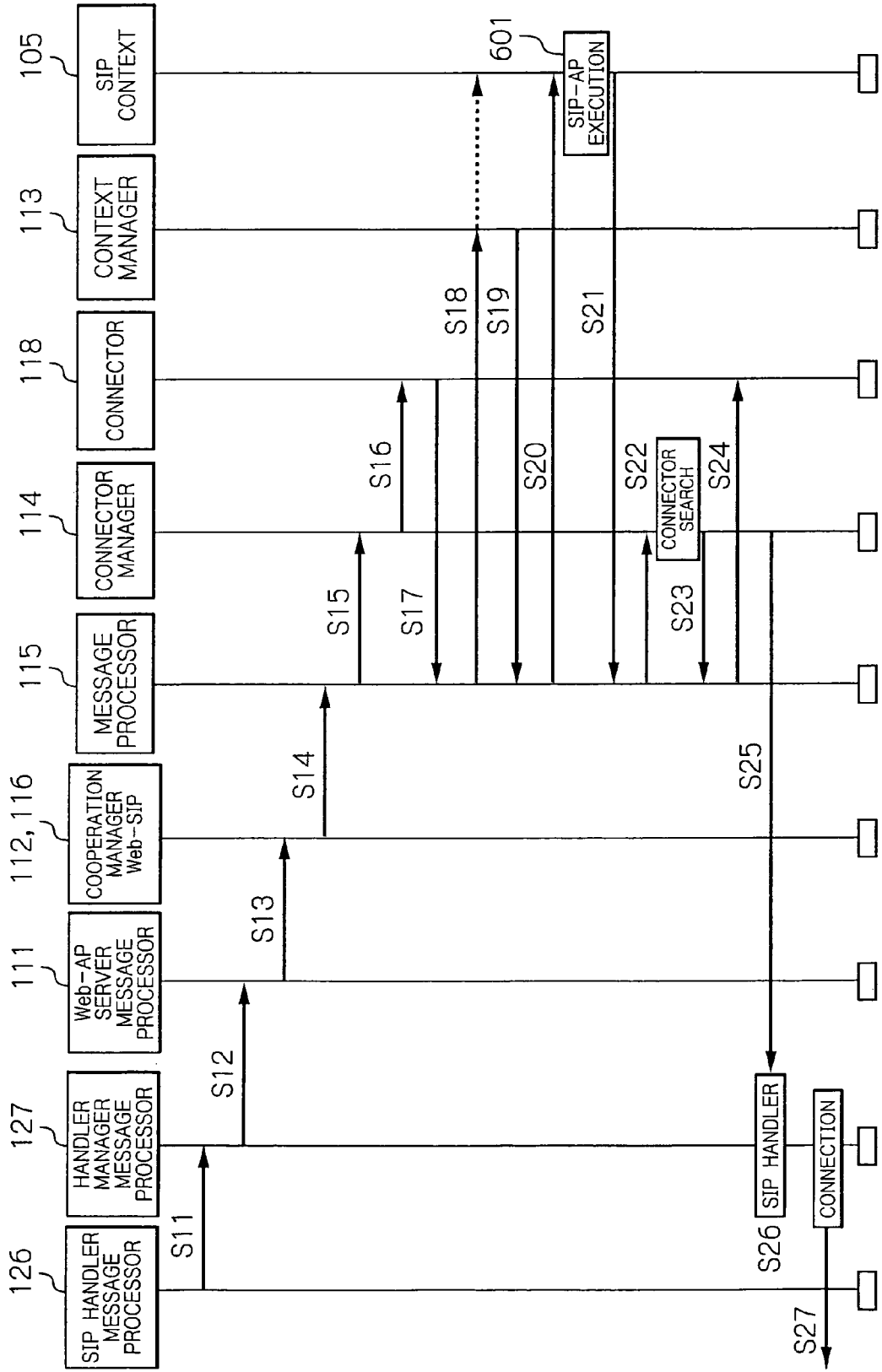
FIG. 6 is a sequence diagram useful for understanding an exemplified operation executed when the service providing system receives a SIP message in the embodiment.

Now, with reference to FIG. 6, the operation will be described that is performed when the service providing system 100 receives a SIP message in the AP server environment in this embodiment. First, when a SIP handler 123, FIG. 1, receives a SIP message from an external device, the message processor 126 composes a SIP message that is transferred. In the SIP message, a SIP handler ID is set, which is identifier information identifying the SIP handler, to be delivered to the handler manager 119 (step S11). The SIP handler ID is, for example, an integer value. The handler manager 119 receives the SIP message via the message processor 127 and delivers the received message to the web-AP execution server 107 (step S12).

The web-AP execution server 107 receives the SIP message via the message processor 111. The message processor 111 delivers the SIP message to the cooperation manager 112 of the web-AP execution server 107 via the SIP message processing module 308 (step S13).

The cooperation manager 112 of the web-AP execution server 107 delivers the SIP message to the cooperation manager 116 of the SIP-AP execution server 108 via the SIP message delivery module 501 (step S14).

The cooperation manager 116 of the SIP-AP execution server 108 receives the SIP message via the SIP message reception module 506. The received SIP message is delivered to the connector manager 114 (step S15).

The connector manager 114 searches for the connector 118 via the connector search module 405 using the SIP handler ID included in the SIP message and acquires a connector 118. Next, the SIP message is delivered to the acquired connector 118 via the message transmission module 408 (step S16). The connector 118 delivers the SIP message to the message processor 115 (step S17).

The message processor 115 requests the context manager 113 to acquire a SIP context 105 (step S18). The context manager 113 searches for a SIP context 105 via the context search module 401 and returns the SIP context 105 to the message processor 115 (step S19). The message processor 115 delivers the SIP message to the SIP context 105 (step S20).

The SIP context 105 delivers the SIP message to a SIP application 601, which executes application processing such as Internet Protocol (IP) telephone connection processing, instant message processing, and presence display. After the execution, the SIP context 105, receives a response indicating the execution result of the application processing. This response includes information indicating a normal termination, an abnormal termination, or a report on processing in progress. The SIP context 105 delivers the response to the SIP-AP execution server 108. More specifically, the response is delivered to the message processor 115 of the SIP-AP execution server 108 (step S21).

The message processor 115 delivers the response to the SIP message transmission module 410. The SIP message transmission module 410 requests the connector manager 114 to acquire a connector 118 (step S22).

The connector manager 114 requests the connector manager 117, via the connector search module 405, to acquire a connector 118 used for connection to the SIP handler 123 and extracts a connector 118 managed by the connector manager 117 (step S23).

The SIP message transmission module 410 delivers the response to the connector 118 (step S24). The connector 118 requests a connection to the SIP handler 123 associated therewith (step S25).

The SIP handler 123 generates a connection via the connection generator 125 and forwards the result to the connector 118 (step S26). The connector 118 uses the connection to deliver the response to the destination (step S27).

Figure 7:
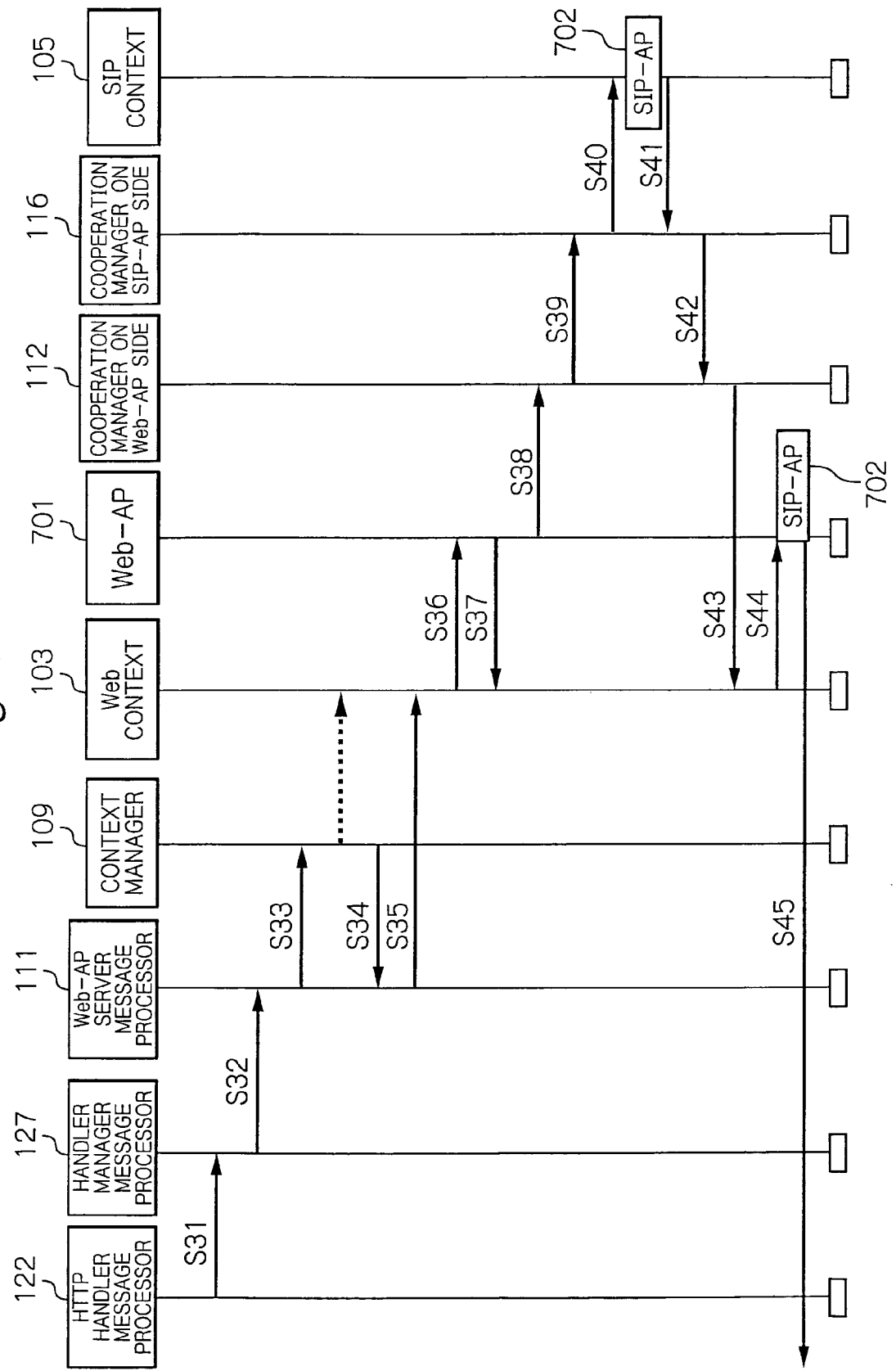
FIG. 7 is a sequence diagram useful for understanding an exemplified operation executed when a web application and a SIP application work together in the embodiment.

Well, an operation in which a web application and a SIP application work together will be described with reference to FIG. 7. In response to a HTTP request, an HTTP handler 122 composes an HTTP message. An HTTP message is, for example, a Get message that displays a specific web page and a Put message that sends out information, entered from a web browser 13-1, to the web-AP server 133. The HTTP handler 122 delivers the HTTP message to the handler manager 119 (step S31).

The handler manager 119 processes the HTTP message via the message processor 127 and delivers the processed message to the web-AP execution server 107 (step S32).

The web-AP execution server 107 delivers the HTTP message to the message processor 111. The message processor 111 requests the context manager 109 to acquire a web context 103 (step S33). The context manager 109 acquires a web context 103 and returns it to the message processor 111 (step S34). The HTTP message processing module 307 of the message processor 111 passes the message to the corresponding web context 103 (step S35).

The web context 103 delivers the message to a web application (web-AP) 701 (step S36). The web application 701 requests the web context 103 to acquire a SIP application (not shown) (step S37). The web context 103 requests its cooperation manager 104 to acquire the SIP application (step S38).

The cooperation manager 104 uses the AP search request transmission module 201 to request the cooperation manager 106 to acquire the SIP application (step S39). The cooperation manager 106 receives the request via the AP search request reception module 206. The AP search request reception module 206 requests a SIP context 105 to acquire the SIP application (step S40).

The SIP context 105 acquires the SIP application (SIP-AP) 702 and returns it to the cooperation manager 106 (step S41). The AP search request reception module 206 returns the SIP application to the cooperation manager 104 (step S42).

The AP search request transmission module 201 of the cooperation manager 104 receives the SIP application and returns it to the web context 103 (step S43). The web context 103 returns the SIP application 702 to the web application 701 (step S44). The web application 701 calls the SIP application 702 and sends out a response to the source of the HTTP request (step S45).

Figure 8:
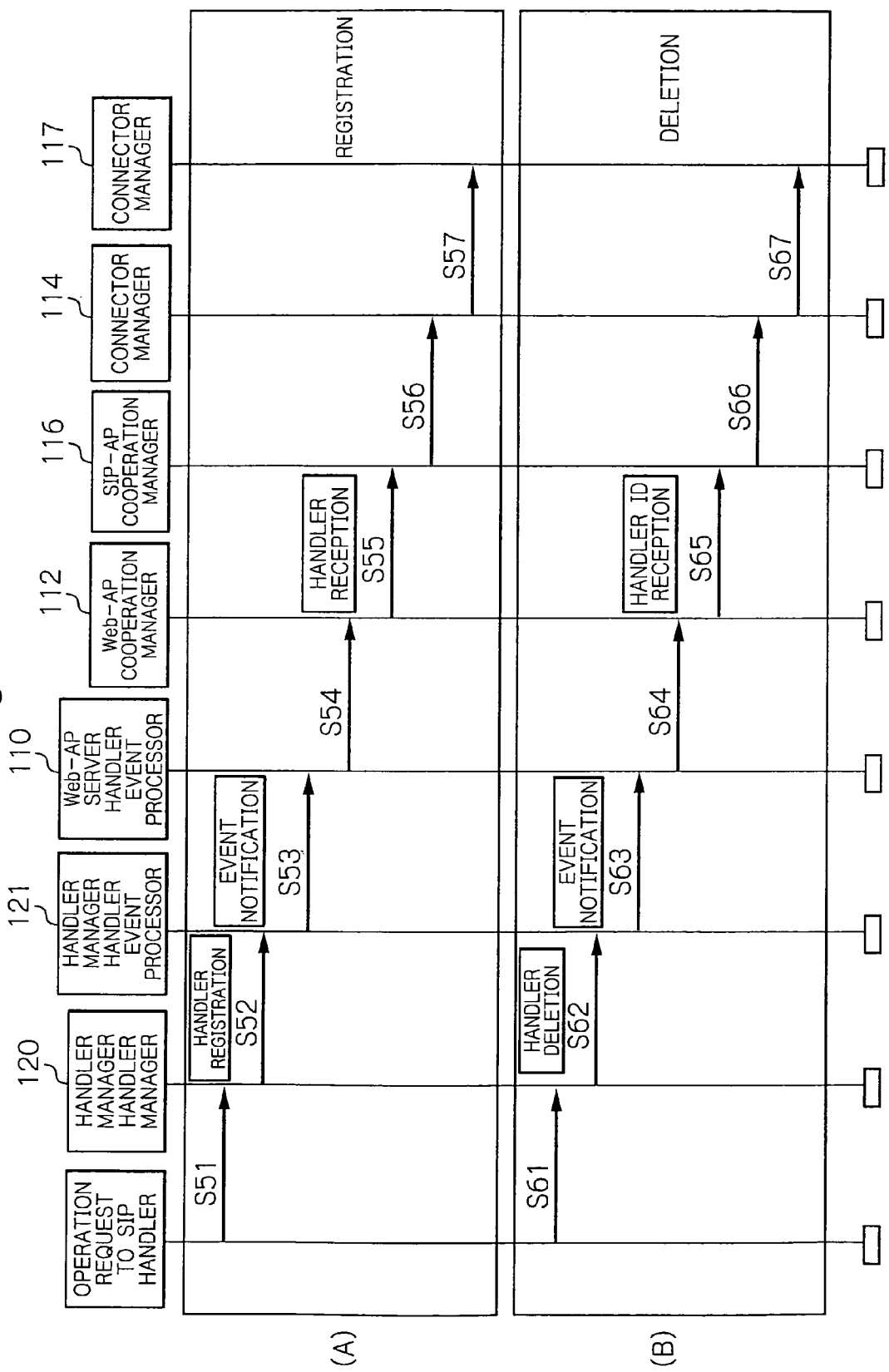
FIG. 8 is a sequence diagram useful for understanding an exemplified operation executed when a SIP handler is registered and deleted in the embodiment.
Figure 9:
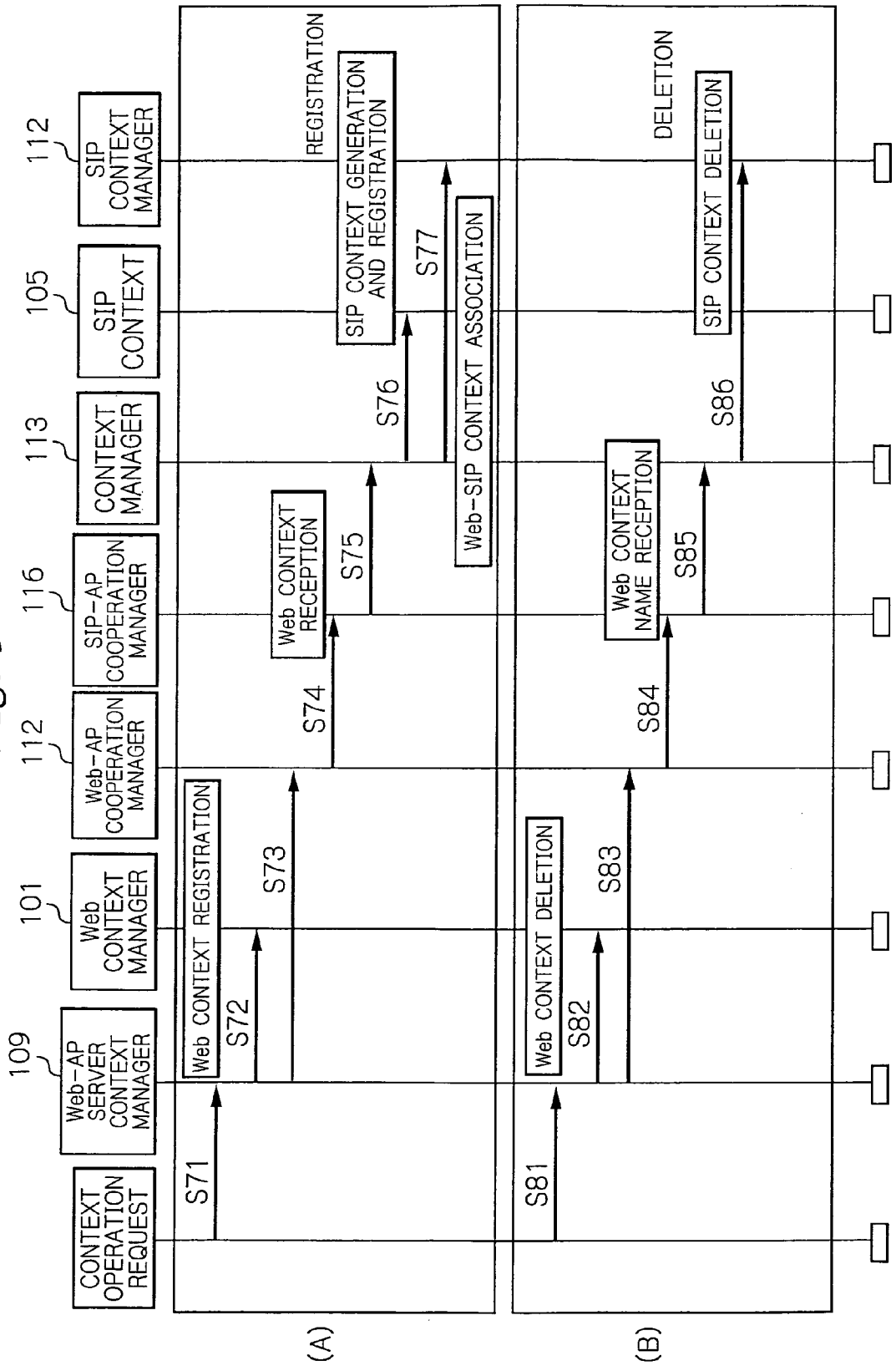
FIG. 9 is a sequence diagram useful for understanding an exemplified operation executed when a context for executing a cooperative type of web and SIP applications is registered and deleted in the embodiment.

Next, the registration and the deletion of a SIP handler 123 and the registration and deletion of a context for executing a unified application of a web application and a SIP application when the method in this embodiment is applied will be described with reference to FIG. 8 and FIG. 9.

First, the registration of a SIP handler 123 will be described with reference to FIG. 8, part (A). The registration of a SIP handler 123 is required, for example, when it is necessary to receive a SIP message using a SIP handler having a port number or a transport protocol different from that of the SIP handler currently registered.

A request for the registration of a SIP handler 123 is sent from a management tool, not shown, to the handler manager 119 (step S51). The "management tool" is usually provided for changing the setting of the web server or the web-AP server.

The handler manager 119 registers a handler via the handler manager 120. Next, a notification is sent from the handler event processor 121 to the web-AP execution server 107 to notify that the handler is registered (step S52).

The web-AP execution server 107 receives an event via the handler registration event reception module 306 of the handler event processor 110. The handler registration event reception module 306 notifies the cooperation manager 112 that the handler is registered (step S53).

The cooperation manager 112 acquires the registered SIP handler 123 and, via the SIP connector registration event delivery module 502, delivers it to the cooperation manager 116 of the SIP-AP execution server 108 (step S54). The cooperation manager 116 receives the SIP handler 123 via the SIP connector registration event reception module 507 (step S55).

The SIP connector registration event reception module 507 delivers the SIP handler 123 to the connector manager 114 (step S56) The connector manager 114 registers the connector 118 with the connector manager 117 via the connector registration module 406 (step S57).

Next, the deletion of a SIP handler 123 will be described with reference to FIG. 8, part (B). The deletion of a SIP handler 123 is started by the management tool, for example, when it is not necessary for the SIP handler to receive a SIP message.

In response to a handler deletion request from the management tool (step S61), the handler manager 119 deletes the handler via the handler manager 120. Next, a notification is sent from the handler event processor 121 to the web-AP execution server 107 to notify that the handler is deleted (step S62).

The web-AP execution server 107 receives the event via the handler deletion event reception module 305 of the handler event processor 110. The handler deletion event reception module 305 notifies the cooperation manager 112 that the handler is deleted (step S63).

The cooperation manager 112 acquires the SIP handler ID of the deleted SIP handler 123 and delivers the SIP handler ID to the cooperation manager 116 of the SIP-AP execution server 108 via the SIP connector deletion event delivery module 503 (step S64). The cooperation manager 116 receives the SIP handler ID via the SIP connector deletion event reception module 508 (step S65).

The SIP connector deletion event reception module 508 delivers the SIP handler ID to the connector manager 114 (step S66). The connector manager 114 deletes the connector 118 from the connector manager 117 via the connector deletion module 407 (step S67).

Next, the registration of a web context, and the registration of a SIP context that is registered as necessary, will be described with reference to FIG. 9, part (A). The registration of a web context and a SIP context is required, for example, when a web application or a SIP application is added in order to publicize an application.

First, the management tool requests the context manager 109 of the web-AP execution server 107 to register a web context (step S71). The context manager 109 registers a web context 103 with the web context manager 101 via its context registration module 302 (step S72).

Next, if it is required to generate a SIP context 105 because the web context is registered, a notification is sent from the context cooperation module 304 to the cooperation manager 112 that the context is added (step S73).

The cooperation manager 112 delivers the registered web context 103 to the cooperation manager 116 of the SIP-AP execution server 108 via the context registration event delivery module 504 (step S74). The context registration event reception module 509 of the cooperation manager 116 receives the registered web context 103 and delivers it to the context manager 113 (step S75).

The context manager 113 generates a SIP context 105 corresponding to the registered web context 103 (step S76). The context manager 113 registers the generated SIP context with the SIP context manager 102 via its context registration module 402 (step S77). Next, the web context cooperation module 404 associates the web context 103 with the SIP context 105.

Next, the deletion of a web context, as well as the deletion of a related SIP context if registered, will be described with reference to FIG. 9, part (B). The deletion of a web context and a SIP context is required when a web application or a SIP application is deleted, for example, when the publication of the application is suspended.

First, the management tool requests the context manager 109 of the web-AP execution server 107 to delete a web context 103 (step S81). The context manager 109 deletes the web context 103 from the web context manager 101 via the context deletion module 303 (step S82).

Successively, if it is required to delete a SIP context 105 because the web context is deleted, a notification is sent from the context cooperation module 304 to the cooperation manager 112 to notify that the context is deleted (step S83).

The cooperation manager 112 delivers the deleted web context name to the cooperation manager 116 of the SIP-AP execution server 108 via the context deletion event delivery module 505 (step S84). The context deletion event reception module 510 of the cooperation manager 116 receives the deleted web context name and delivers it to the context manager 113 (step S85).

The context manager 113 deletes a SIP context with the same name as that of the deleted web context from the SIP context manager 102 via the context deletion module 403 (step S86).

As described above, an application created in the web environment and an application created in the SIP environment can work together in this embodiment. This means that the execution environment of an application, which is a unified application for the web protocol and the SIP protocol, can be created based on the web-AP execution server 107. This realizes a SIP-protocol-based real-time communication service in the web application environment that cannot be realized in the conventional web-AP server environment.

More specifically, the embodiment can be applied as follows: (1) When a user seeks a help during execution of an electronic commerce application such as an Internet shopping application built as a web application, processing control is passed to the SIP application to allow the vendor to help the user in the operation with the use of the support function such as an IP telephone or a television (TV) conference function. (2) The members of a group who share information during execution of an information-sharing web application conduct a telephone conference or a TV conference as necessary to promote cooperation among the members of the group. (3) When an item to be procured runs short during execution of a procurement web application or a production management web application, the information is passed to the SIP application to automatically send out a message to the person in charge of procurement in real time.

Figure 10:
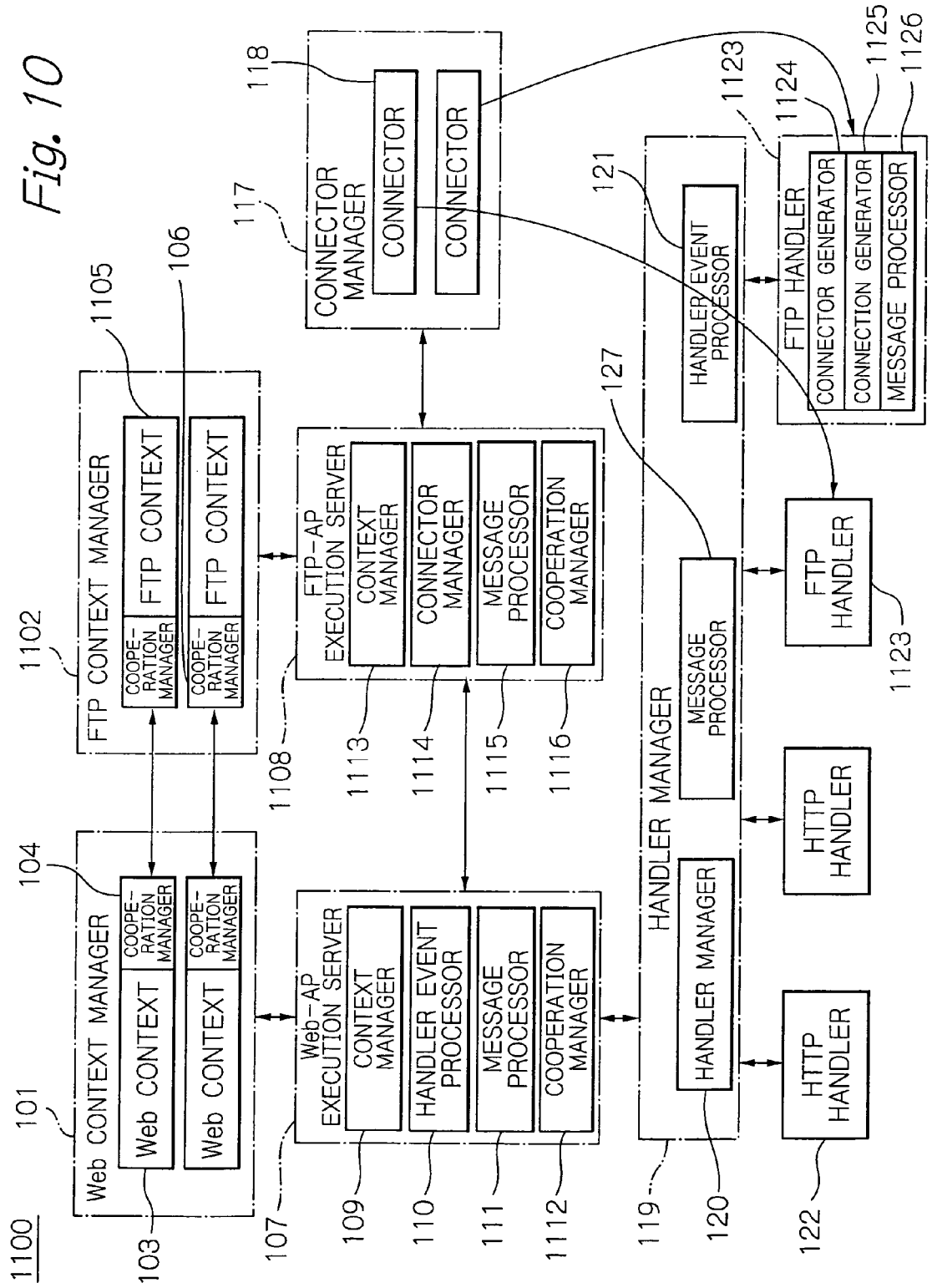
FIG. 10 is a schematic block diagram, similar to that in FIG. 1, showing the functional configuration of a service providing system in an alternative embodiment of the present invention.

Well, an alternative embodiment of a service providing system according to the present invention will be described with reference to the remaining figures. FIG. 10 is a schematic block diagram showing the functional configuration of a service providing system 1100 in an alternative embodiment. The SIP-AP server environment is integrated into the web-AP server in the embodiment described above with reference to FIG. 1, while the web-AP server and the FTP-AP server environment are integrated in this embodiment.

As is apparent from a comparison with the configuration shown in FIG. 1, the configuration of the embodiment in FIG. 10 is basically similar to that of the embodiment in FIG. 1 except that the components 102-126 specific to the SIP protocol in the embodiment in FIG. 1 are replaced with the components 1102-1126 specific to File Transfer Protocol (FTP). In the figures, the same reference numerals as those in FIG. 1 designate like structural elements to avoid redundancy in the description.

Figure 11:
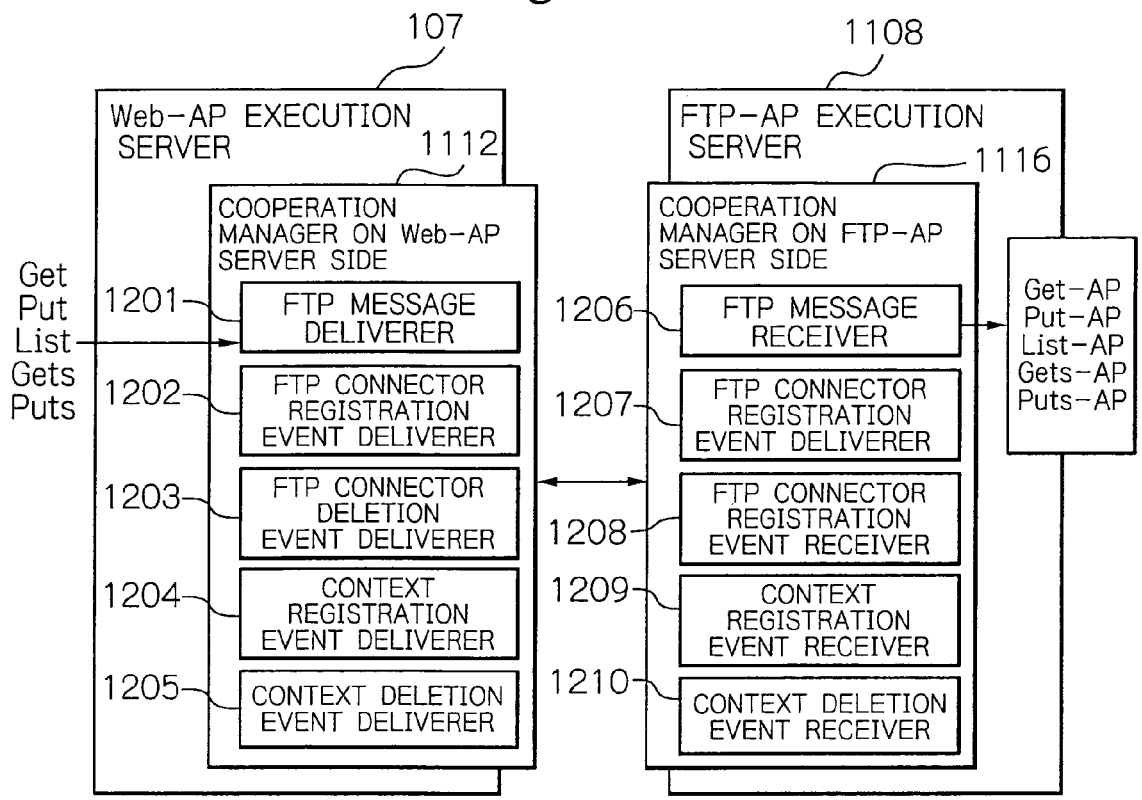
FIG. 11 is a schematic block diagram showing an example of the functional configuration of cooperation managers of a web-AP execution server and an FTP-AP execution server in the embodiment shown in FIG. 10.

FIG. 11 shows the functional components that execute cooperation processing between a web application and an FTP application (FTP-AP) in the embodiment shown in FIG. 10. As seen from FIG. 11, a web-AP execution server 107 creates an FTP message for executing FTP protocol processing, such as Get, Put, and List, using an FTP message delivery module 1201 and passes this message to an FTP message reception module 1206 of an FTP-AP execution server 1108. After receiving the FTP message, the FTP-AP execution server 1108 executes an FTP application.

As described above, an application created in the web environment and an FTP application created in the FTP environment can work together in this embodiment. This means that the execution environment can be built for a cooperative type of application created by making a web application based on a web-AP server cooperative with an application based on the FTP protocol. More specifically, it becomes easier to deliver a required large file when a web-based group work is done and to display an inquiry on the web browser side when a large file is sent or received.

It is also possible to combine the technical concepts of the two embodiments described above with each other to establish an environment in which a web protocol, SIP, and FTP are made cooperative.

The embodiment shown in FIG. 1 is an example in which the SIP-AP server environment is integrated into the web-AP execution server, while the alternative embodiment shown in FIG. 10 is an example in which the FTP-server-based file transfer environment is integrated into the web-AP execution server. Of course, these are mere examples. The method provided by the present invention makes it possible for the web-AP server to be applied as a base environment for creating an application environment based on various protocols.

A still alternative embodiment of the present invention will be described with reference to FIG. 14. The illustrative embodiment 1400 is the same as the embodiments described above except that in the still alternative embodiment a SIP-AP server and a web-AP server are loosely coupled with each other and there is no need to modify the existing web-AP server. Major structural differences are as follows.

First, a handler manager 119 comprises an HTTP handler manager 1019 and a SIP handler manager 1028 in this embodiment. Next, the function of a connector 118 is integrated into a SIP handler 123. In addition, the integration of a SIP-AP server with a web-AP server is implemented in this embodiment by the event function provided by a web application server rather than by the cooperation management components 112 and 116. The SIP-AP server provides the web-AP server with modules for using a SIP application. The remaining components may basically be the same as those described in the embodiments described above.

Figure 14:
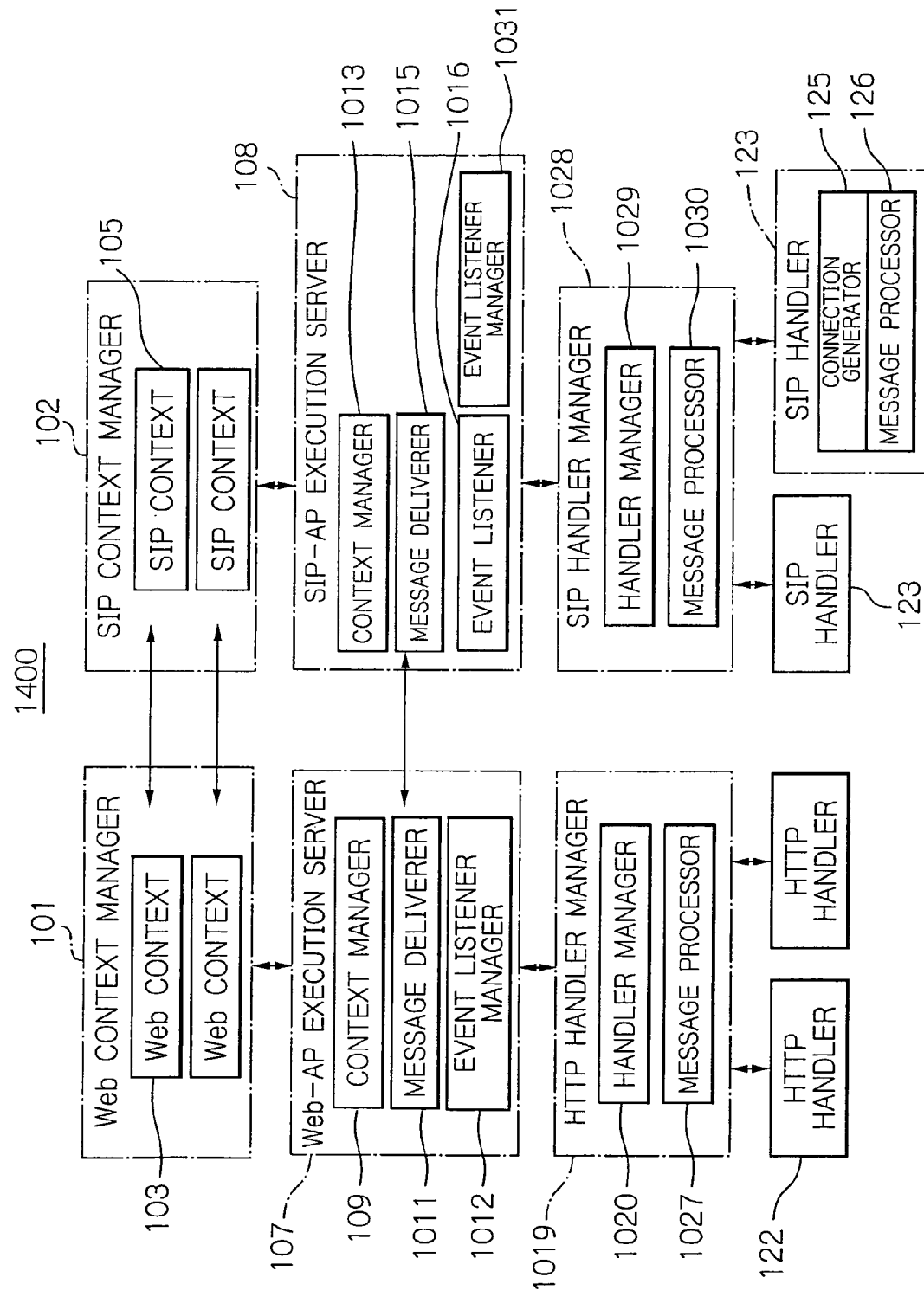
FIG. 14 is a schematic block diagram, similar to that in FIG. 1, showing the functional configuration of a service providing system in a still alternative embodiment of the present invention.

Referring now to FIG. 14, a web context manager 101 and a SIP context manager 102 do not have components corresponding to the cooperation managers 104 and 106, FIG. 1, respectively. A web context 103 is a component that provides the execution environment of a web application. For example, the web context 103 provides not only the function to write in an execution log and the function to distribute requests to web applications as described above but also the interface function including the management of attributes. The detailed functional configuration will be described later. A SIP context 105 is a component that provides the execution environment of a SIP application. For example, the SIP context 105 provides not only the function to write in an execution log and the function to distribute requests to SIP applications described above but also the interface function including the management of attributes. The detailed functional configuration will be described later.

A web-AP execution server 107 and a SIP-AP execution server 108 are basically the same as those of the embodiment shown in FIG. 1. A context manager 109 is a component that communicates with the web context manager 101, and has the function to register and delete a context. In addition, the context manager 109 has the function to send out an event when a context is registered or deleted.

As shown in the figure, the web-AP execution server 107 has a message deliverer 1011 that is a component for delivering an HTTP message to an appropriate context. The web-AP execution server 107 also has an event listener manager 1012. The latter is a component for managing an event listener that will be described later. The event listener, included in the SIP-AP execution server 108, notifies the SIP-AP execution server 108 that a web context is registered or deleted. The event listener 1016 that will be described later is registered as one of such event listeners.

A context manager 113, included in the SIP-AP execution server 108, is a component that communicates with the SIP context manager 102 and that has the function to register and delete a context. The SIP-AP execution server 108 has a message deliverer 1015 that is a component for delivering a SIP message to an appropriate context. This component also has the function to deliver a SIP request, received from a SIP application, to the destination. The SIP-AP execution server 108 has an event listener 1016. This is a component for notifying the operation contents to the SIP-AP execution server 108 when the web-AP execution server 107 processes a context.

The HTTP handler manager 1019 described above is a component that passes a message, received from an HTTP handler 122, to the web-AP execution server 107. The HTTP handler manager 1019 has a handler manager 1020. The handler manager 1020, a component for managing an HTTP handler 122, has the function to add and delete a HTTP handler 122.

The HTTP handler 122 may be the same as that used in the embodiment shown in FIG. 1. The SIP handler 123 is a component that receives a message according to the SIP protocol and composes a SIP message to be passed to a SIP application. The SIP handler 123 has a connection generator 125 that is a module for generating a connection. As shown in figure, the SIP handler 123 has a message processor 126. This is a component that receives a message according to a particular transport protocol and composes data, received via a socket, into a SIP message.

As shown in the figure, the HTTP handler manager 1019 has a message processor 1027. This is a component that passes an HTTP message, received from an HTTP handler 122, to the web-AP execution server 107.

The other handler manager, i.e. SIP handler manager 1028, is a component that passes a message, received from the SIP handler 123, to the SIP-AP execution server 108. The SIP handler manager 1028 has a handler manager 1029 that is a component for managing SIP handlers 123. This handler has the function to add and delete a SIP handler 123.

As shown in the figure, the SIP handler manager 1028 has a message processor 1030. This message processor is a component that passes a SIP message, received from a SIP handler 123, to the SIP-AP execution server 108.

Figure 15:
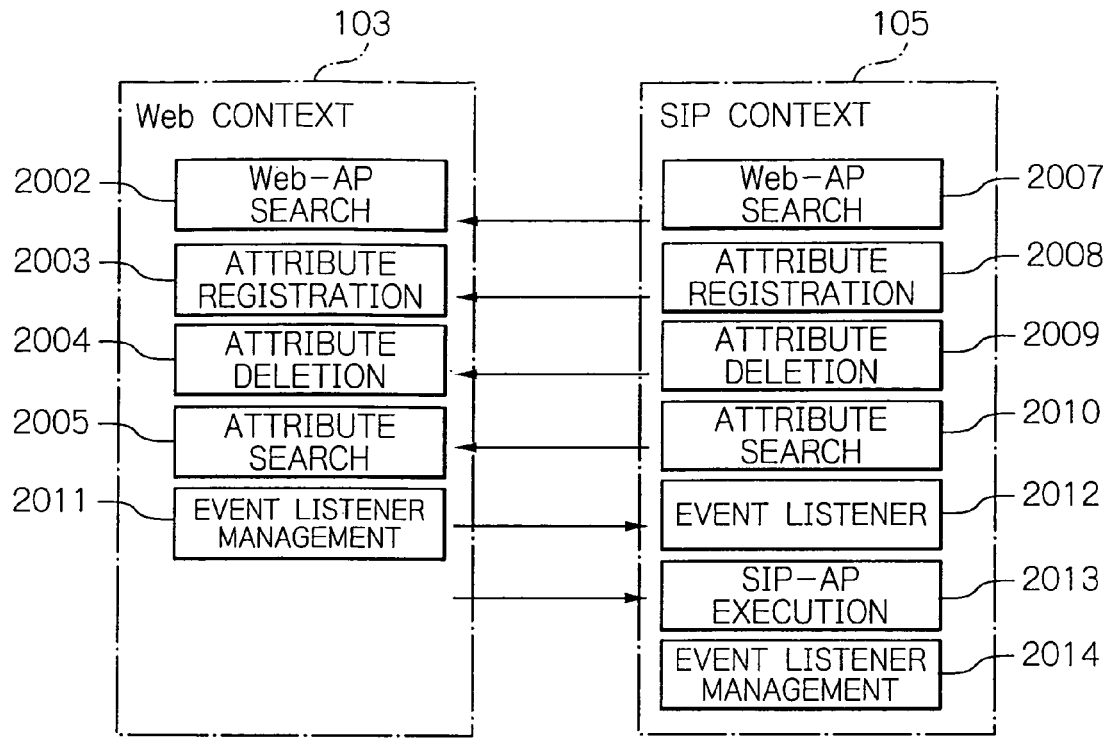
FIG. 15 is a schematic block diagram, similar to that in FIG. 2, showing an example of the functional configuration of a web context manager and a SIP context manager in the embodiment in FIG. 14.

Well, the configuration of the web context 103 and the SIP context 105 will be described with reference to FIG. 15. Typically, the web context 103 comprises an AP search request reception module 2002, an attribute registration request reception module 2003, an attribute deletion request reception module 2004, an attribute search request reception module 2005, and an event listener management module 2011 as shown in the figure.

The AP search request reception module 2002 is adapted for allowing the SIP context 105 side to search for a web application managed by the web side. This module mates with an AP search request transmission module 2007 in the SIP context 105 that will be described later.

The attribute registration request reception module 2003 is adapted for allowing the SIP context 105 side to register the attribute information on a web application managed by the web side. This module mates with an attribute registration request reception module 2008 in the SIP context 105 that will be described later. The attribute deletion request reception module 2004 allows the SIP context 105 side to delete the attribute information on a web application managed by the web side. This module mates with an attribute deletion request reception module 2009 of the SIP context 105.

The attribute search request reception module 2005 allows the SIP context 105 side to search for the attribute information on a web application managed by the web side. This module mates with an attribute search request reception module 2010 of the SIP context 105.

The event listener management module 2011 is provided on the web side to manage an event listener for notifying that the attribute information on a context is registered, deleted, or updated. An event listener 2012 is registered as one of such event listeners.

Typically, the SIP context 105 comprises, as shown in the figure, an AP search request transmission module 2007, an attribute registration request reception module 2008, an attribute deletion request reception module 2009, an attribute search request reception module 2010, an event listener 2012, a SIP-AP execution module 2013, and an event listener management module 2014.

The AP search request transmission module 2007 allows the web context 103 side to search for a SIP application managed by the SIP side.

The attribute registration request reception module 2008 registers the attribute information on a web application managed by the web side. The attribute deletion request reception module 2009 deletes the attribute information on a web application managed by the web side.

The attribute search request reception module 2010 searches for the attribute information on a web application managed by the web side. The event listener 2012 notifies the contents of processing to the SIP context side when the attribute information is processed by the web side.

The SIP-AP execution module 2013 executes a SIP application. This module is used by a web application to execute a SIP application.

The event listener management module 2014 is provided on the SIP side to be used to manage an event listener that notifies that the attribute information on a context is registered, deleted, or updated.

Figure 16:
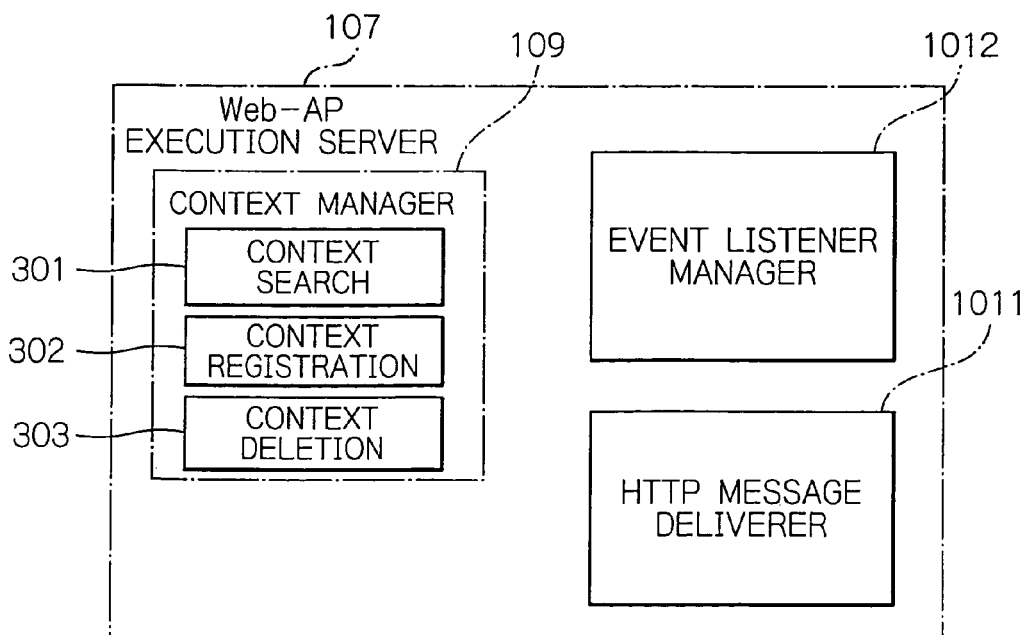
FIG. 16 is a schematic block diagram, similar to that in FIG. 3, showing an example of the specific configuration of a web-AP execution server in the still alternative embodiment.

Next, the configuration of the web-AP execution server 107 will be described with reference to FIG. 16. The context manager 109 comprises a context search module 301, a context registration module 302, and a context deletion module 303 that are modules basically similar to those in the embodiment in FIG. 1 described above. Note that the context manager 109 does not have a context cooperation module 304.

As shown in the figure, the web-AP execution server 107 has an HTTP message deliverer 1011. This is a component for delivering an HTTP message to an appropriate context. The web-AP execution server 107 also has an event listener manager 1012. This is a component that manages an event listener that notifies that a web context is registered or deleted.

Figure 17:
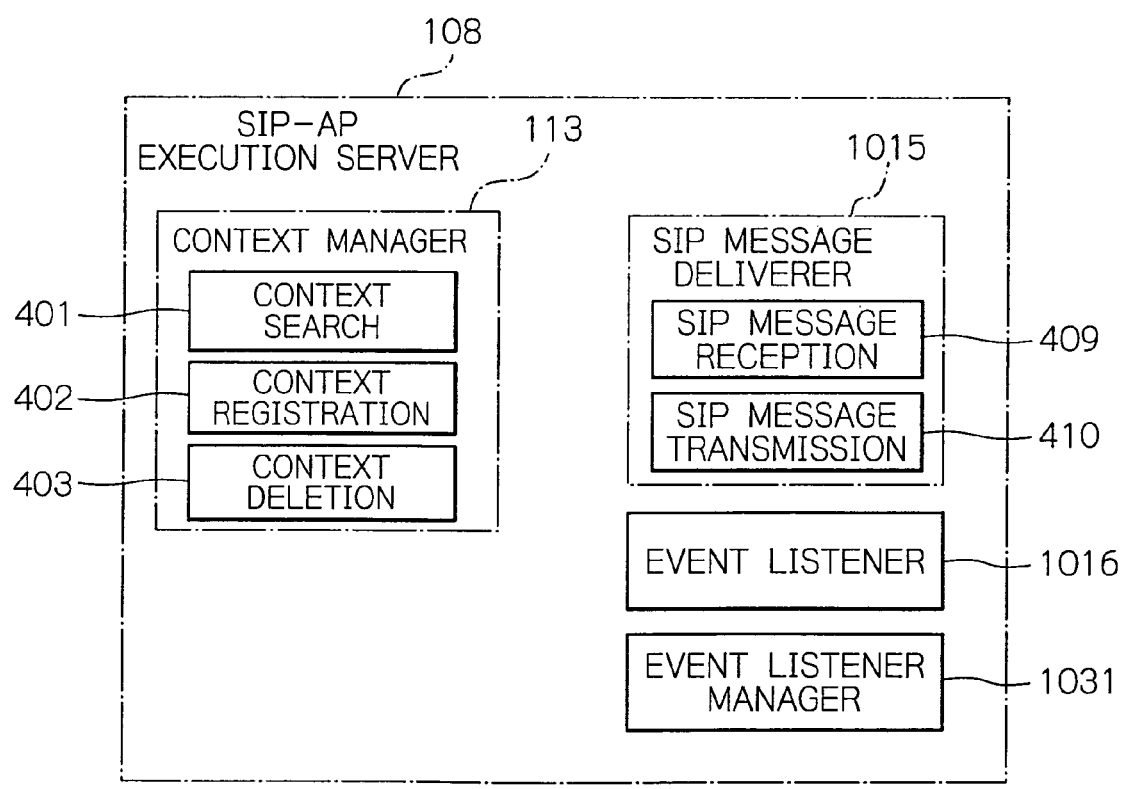
FIG. 17 is a schematic block diagram, similar to that in FIG. 4, showing an example of the specific configuration of a SIP-AP execution server in the still alternative embodiment.

With reference to FIG. 17, the configuration of the SIP-AP execution server 108 connected to the web-AP execution server 107 will be described. The context manager 113 comprises a context search module 401, a context registration module 402, and a context deletion module 403. Of course, the context manager 113 does not have a web context cooperation module 404.

Figure 4:
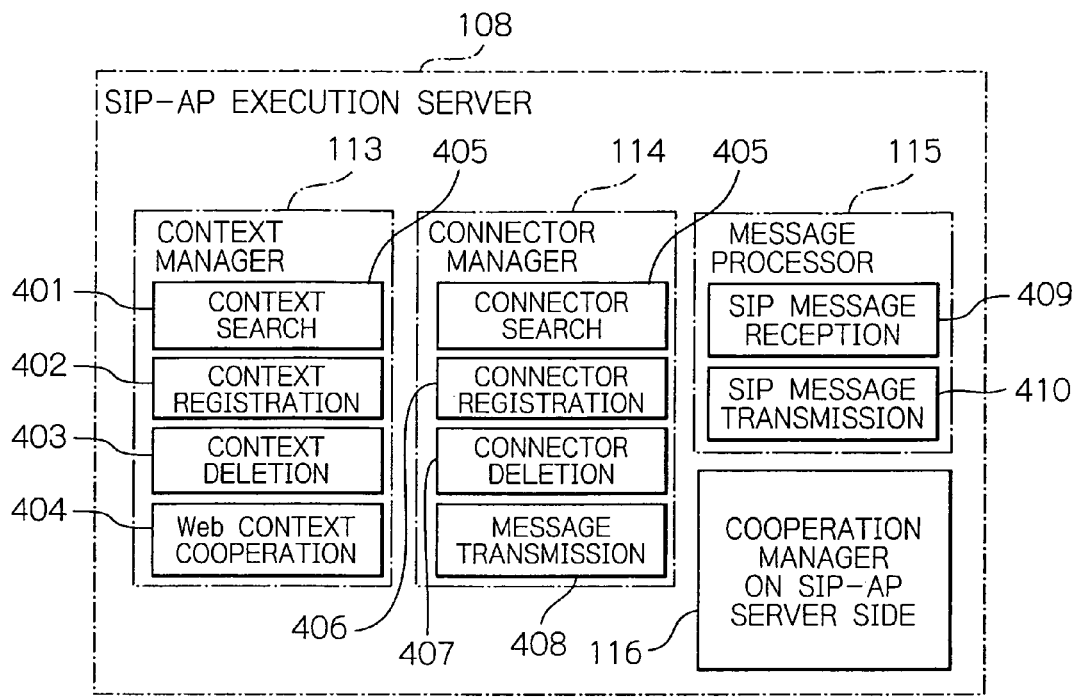
FIG. 4 is a schematic block diagram showing an example of the specific configuration of a SIP-AP execution server in the embodiment.

The message deliverer 1015 may be the message processor 115, FIG. 4, included in the embodiment in FIG. 1. The message deliverer 1015 may be the same as that shown in FIG. 1 except that a SIP message reception module 409 receives a SIP message from the SIP handler 123 and delivers it to a SIP context 105 that executes the target SIP application and that a SIP message transmission module 410 delivers a SIP message, received from a SIP context 105, to the SIP handler 123.

The event listener 1016 is a component for notifying the processing contents to the SIP-AP execution server 108 when the web-AP execution server 107 processes a context. The event listener manager 1031 is a component for managing the event listener for receiving as an event the fact of the context operation, such as registration or deletion, made on the SIP context. For example, whenever a context was deleted from a management tool on the web, the event listener manager 1031 will notify the event listener under its management of the event.

Figure 18:
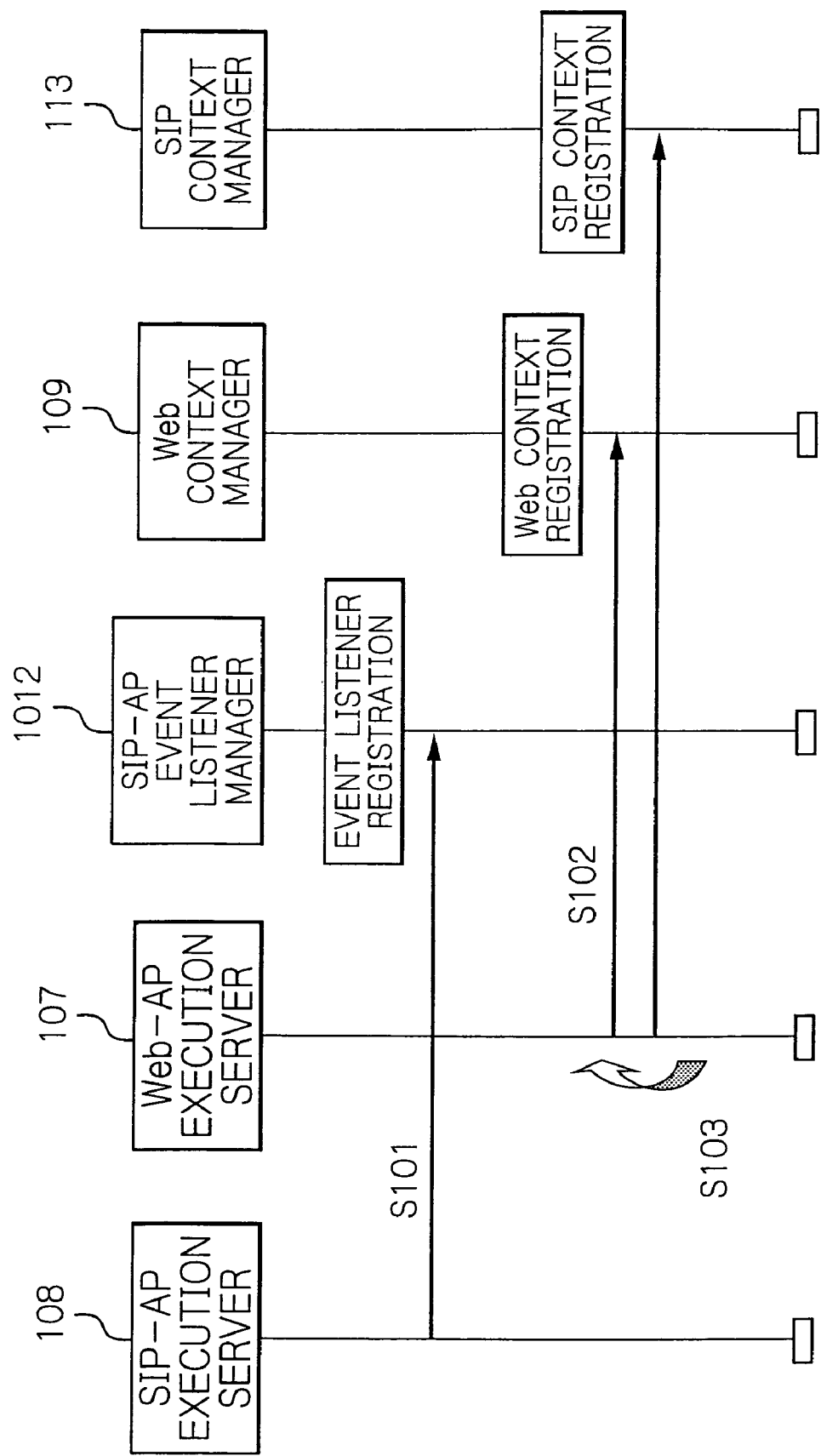
FIG. 18 is a sequence diagram useful for understanding an exemplified operation executed when the service providing system is initialized in the still alternative embodiment.

FIG. 18 shows how the AP server environment will be initialized in this embodiment. First, the web-AP server and the SIP-AP server are started. The SIP-AP execution server 108 registers an event listener 1016 with the event listener manager 1012 of the web-AP execution server 107 (step S101).

The web-AP execution server 107 generates a web context 103 according to the setting information on the web application and sets the web context 103 in the web context manager 101. At this time, a SIP context 105 is also generated and registered with the SIP context manager 102 (step S102). The registration of a web context 103 will be described later. The web-AP execution server 107 repeats step S102 the number of times equal to the number of web applications (step S103).

Figure 19:
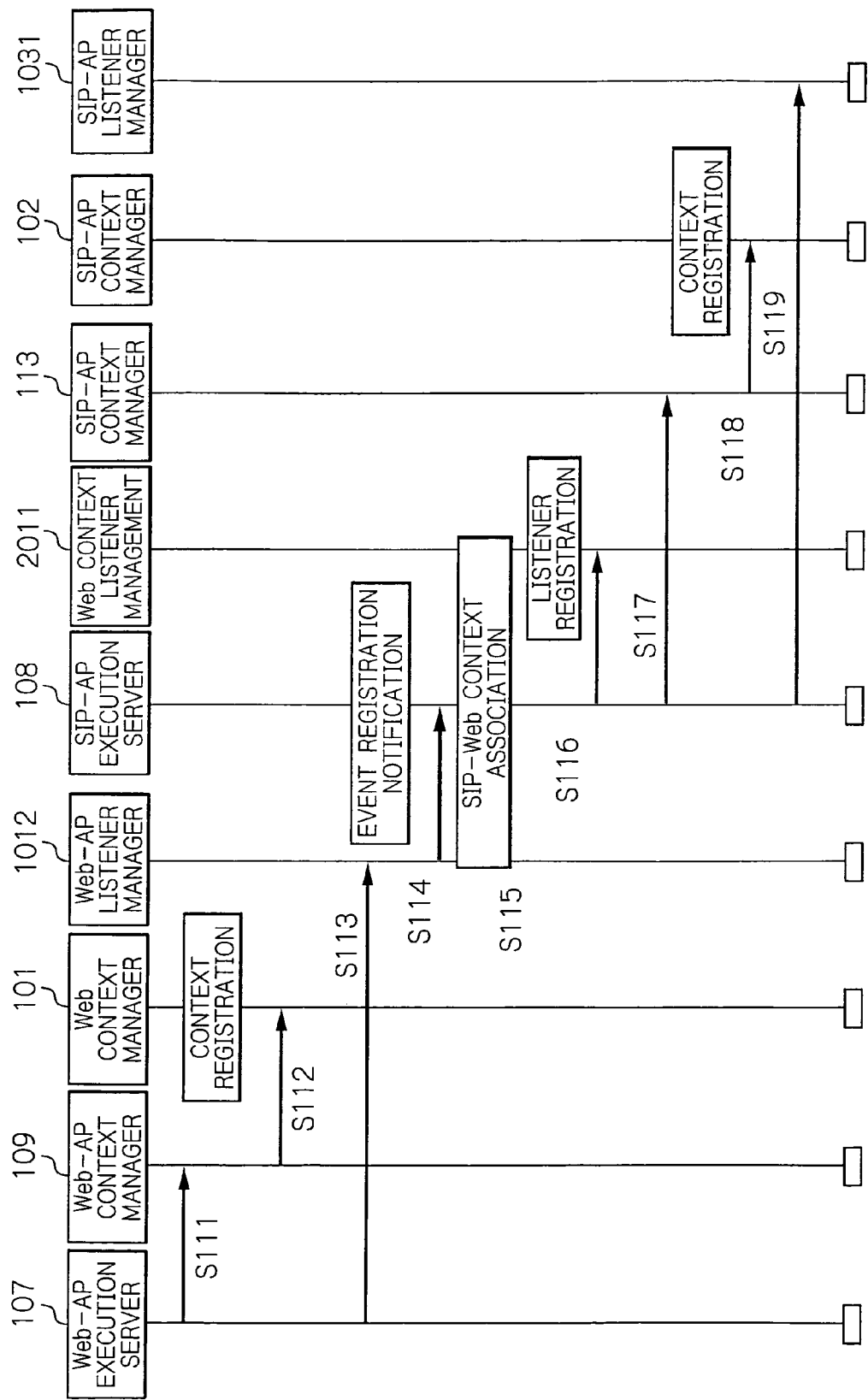
FIG. 19 is a sequence diagram useful for understanding an exemplified operation executed when a context is registered in the embodiment.

Next, with reference to FIG. 19, the registration of a context in the AP server environment will be described. The web-AP execution server 107 generates a web context 103 according to the setting information on a web application and requests the context registration module 302 of the context manager 109 to register the web context 103 (step S111). The context registration module 302 registers the web context 103 with the web context manager 101 (step S112).

The web-AP execution server 107 notifies the event listener 1016, managed by the event listener manager 1012, that the web context 103 is generated (step S114). The SIP-AP execution server 108 is notified by the event listener 1016 that the web context 103 is generated.

The SIP-AP execution server 108 generates a SIP context 105, whose name matches the context name of the generated web context, and associates the generated SIP context 105 with a web context 103 (step S115). The SIP-AP execution server 108 registers the event listener module 2012 of the SIP context 105 with the event listener management module 2011 of the web context 103 (step S116).

The SIP-AP execution server 108 requests the context registration module 402 of the context manager 113 to register the SIP context 105 (step S117). The context registration module 402 registers the SIP context 105 with the SIP context manager 102 (step S118). The SIP-AP execution server 108 notifies an event listener, managed by an event listener manager 1031, that the SIP context 105 is registered (step S119).

Figure 20:
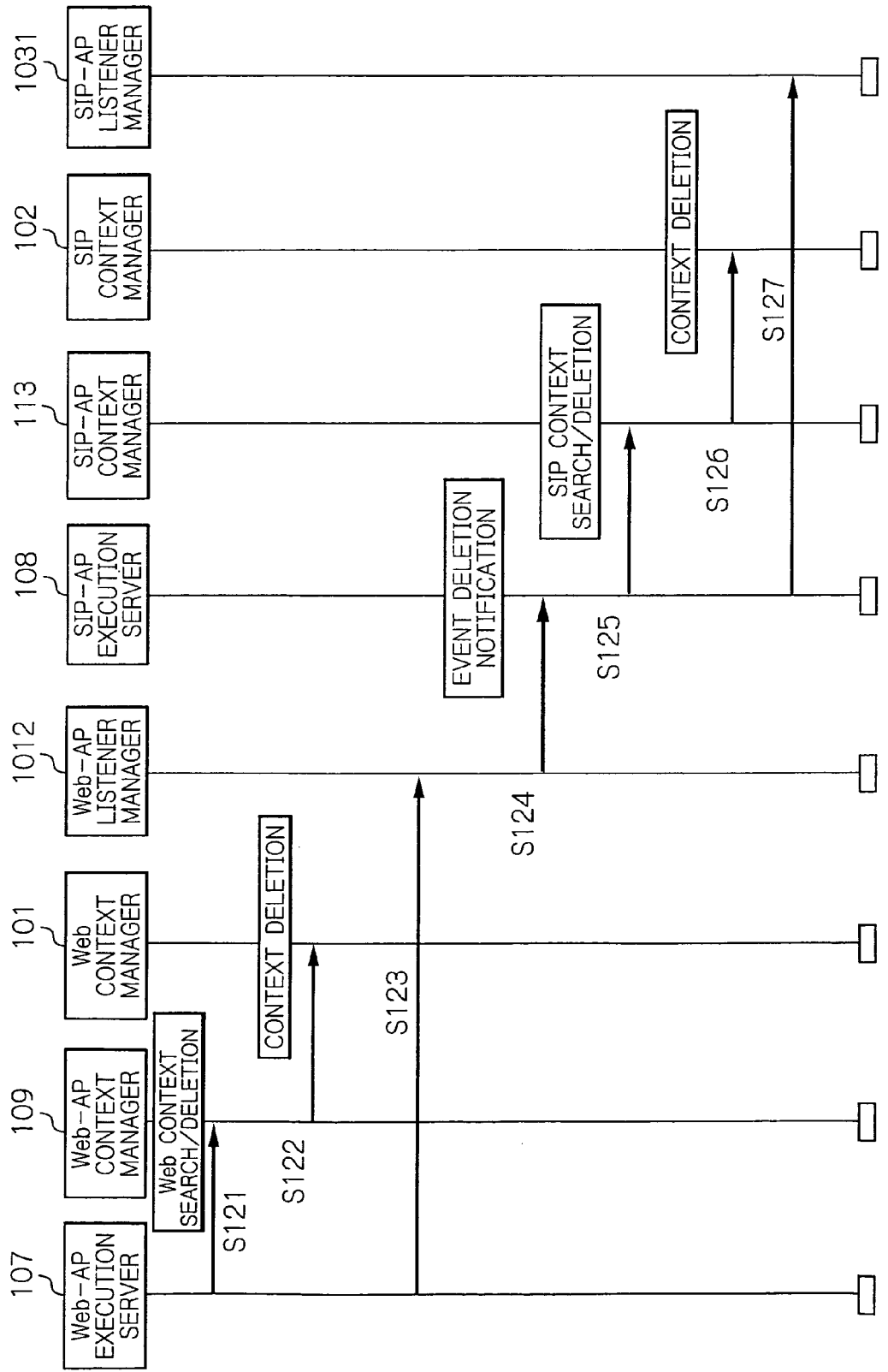
FIG. 20 is a sequence diagram useful for understanding an exemplified operation executed when a context is deleted in the embodiment.

The deletion of a context from the AP server environment will be described with reference to FIG. 20. The web-AP execution server 107 searches for a web context 103 via the context search module 301 of the context manager 109. If an intended context is found, the web-AP execution server 107 requests the context deletion module 303 to delete the web context (step S121). The context deletion module 303 deletes the web context 103 from the web context manager 101 (step S122).

The web-AP execution server 107 notifies the event listener 1016, managed by the event listener manager 1012, that the web context 103 is deleted (step S123). The SIP-AP execution server 108 is notified by the event listener 1016 that the web context 103 is deleted (step S124).

The SIP-AP execution server 108 searches for a SIP context 105, whose context name matches that of the deleted web context, via the context search module 401 of the context manager 113. If the context is found, the SIP-AP execution server 108 requests the context deletion module 403 to delete the SIP context 105 (step S125). The context deletion module 403 deletes the SIP context 105 from the SIP context manager 102. The SIP-AP execution server 108 notifies the event listener, managed by the event listener manager 1031, that the SIP context 105 is deleted.

Figure 21:
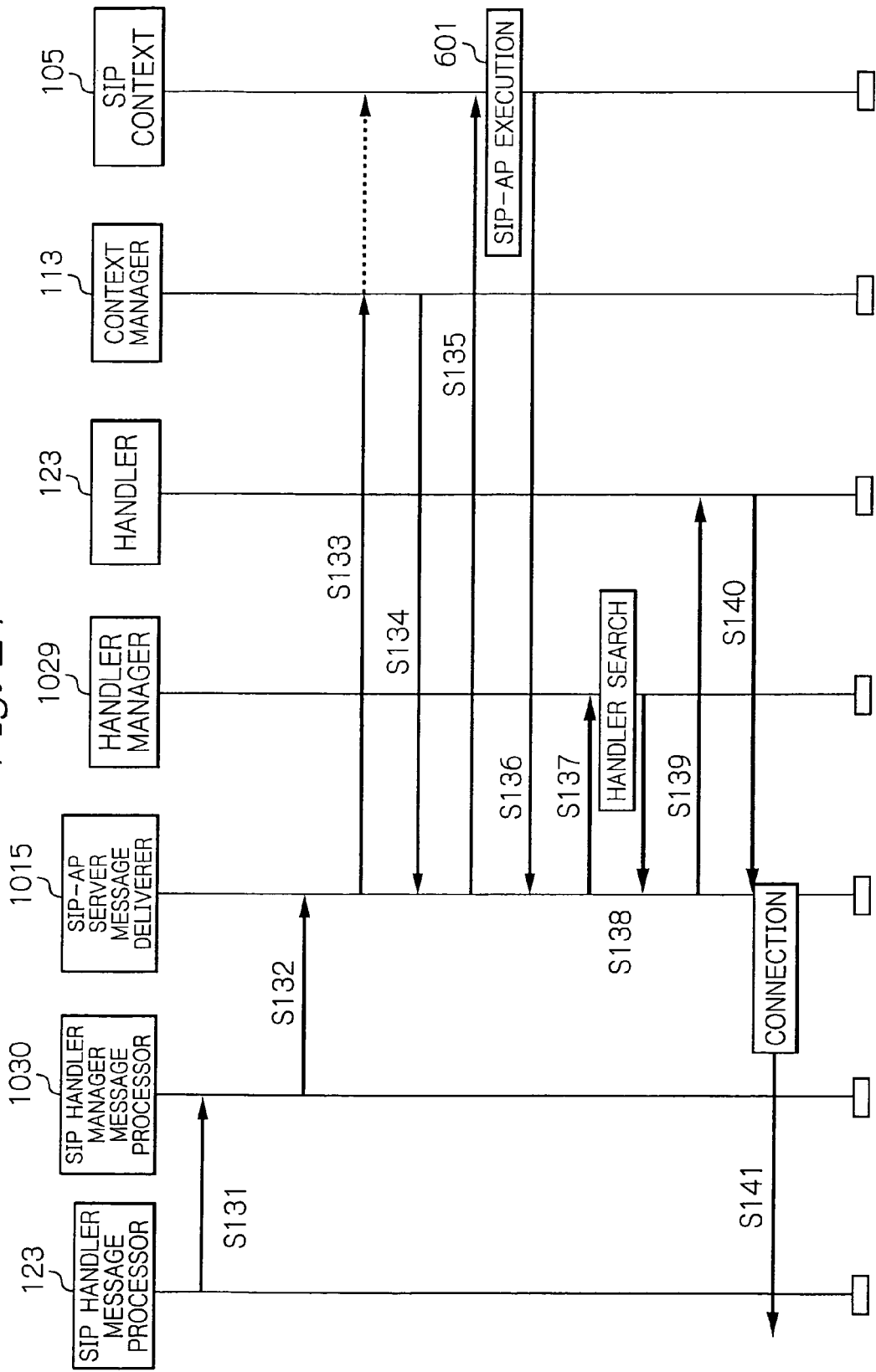
FIG. 21 is a sequence diagram, similar to that in FIG. 6, useful for understanding an exemplified operation executed when the service providing system receives a SIP message in the embodiment.

Next, the reception of a SIP message in the AP server environment will be described with reference to FIG. 21. When a SIP handler 123 receives a SIP message received from a socket and represented by a byte string, the message processing module 126 converts this SIP message from the byte string to a SIP message recognizable by the SIP-AP execution server 108. This SIP message is delivered to the SIP handler manager 1028 (step S131).

The SIP handler manager 1028 receives this SIP message via the message processor 1030 and delivers it to the SIP-AP execution server 108 (step S132). The SIP-AP execution server 108 receives the SIP message via the SIP message reception module 409 of the message deliverer 1015. The SIP message reception module 409 requests the context manager 113 to acquire a SIP context 105 (step S133).

The context manager 113 searches for a SIP context 105 via the context search module 401 and returns the retrieved SIP context 105 to the SIP message reception module 409 (step S134). The SIP message reception module 409 delivers the SIP message to the SIP context 105 (step S135).

The SIP context 105 delivers the SIP message to the SIP application, and the SIP application executes the processing of the application 601 such as IP telephone connection processing, instant message processing, and presence display. After the execution, the SIP context 105 receives a response. This response includes information indicating a normal termination, an abnormal termination, or a report on processing in progress. The response is delivered to the SIP-AP execution server 108 and then to the message deliverer 1015 (step S136).

The message deliverer 1015 delivers the response to the SIP message transmission module 410. The SIP message transmission module 410 requests the handler manager 1029 to acquire a SIP handler 123 (step S137). The handler manager 1029 searches for a SIP handler 123 and returns a retrieved handler to the SIP message transmission module 410 (step S138)

The SIP message transmission module 410 requests the SIP handler 123 to generate a connection (step S139). The SIP handler 123 generates a connection via the connection generator 125 and returns the generated connection to the SIP message transmission module 410 (step S140). The SIP message transmission module 410 uses this connection to deliver the response to the destination (step S141).

Figure 22:
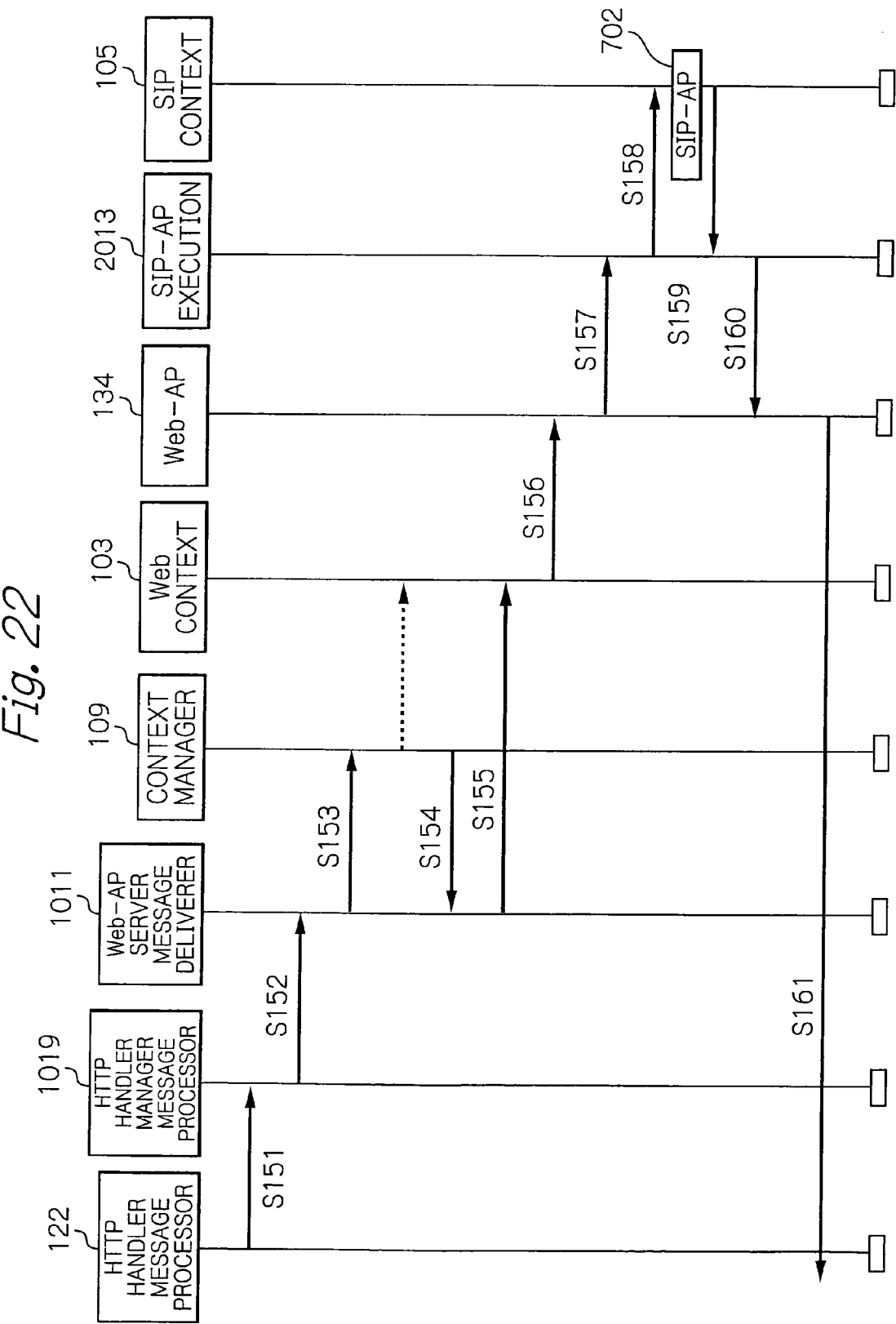
FIG. 22 is a sequence diagram, similar to that in FIG. 7, useful for understanding an exemplified operation executed when a web application and a SIP application work together in the embodiment.

Next, with reference to FIG. 22, cooperation will be described between a web application and a SIP application. In response to an HTTP request, the HTTP handler 122 composes an HTTP message. This message is, for example, a Get message for displaying a specific web page or a Put message for sending information, entered from the web browser 13-1, to the web-AP server 133. This message is delivered to the HTTP handler manager 1019 (step S151). The HTTP handler manager 1019 processes this message via the message processor 1027 and delivers the processed message to the web-AP execution server 107 (step S152).

The web-AP execution server 107 delivers the message to the message deliverer 1011. The message deliverer 1011 requests the context manager 109 to acquire a web context 103 (step S153). The context manager 109 acquires a web context. 103 and returns it to the message deliverer 1011 (step S154) The HTTP message deliverer 1011 returns the message to the web context 103 (step S155).

The web context 103 delivers the message to the web application 134 (step S156). The web application 134 requests the SIP-AP execution module 2013 of the SIP context 105 to execute the SIP application (step S157).

The SIP-AP execution module 2013 acquires the SIP application 702 via the SIP context 105 (step S158). The SIP-AP execution module 2013 executes the SIP application (step S159). The SIP-AP execution module 2013 returns the execution result of the SIP application to the web application (step S160). The web application 134 returns the response to the source of the HTTP request (step S161).

Figure 23:
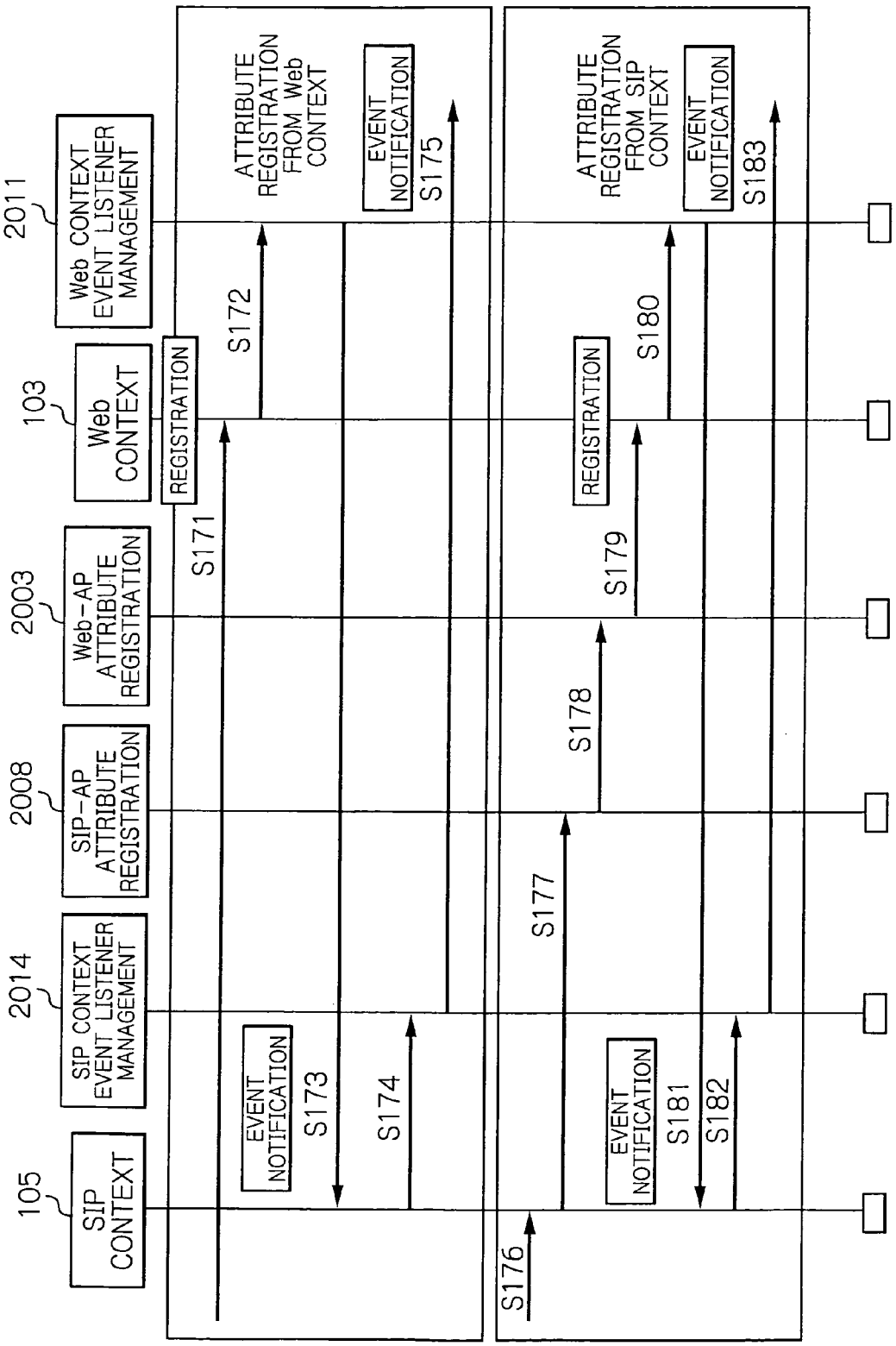
FIG. 23 is a sequence diagram useful for understanding an exemplified operation executed when the attribute of a context is registered in the embodiment.

Referring to FIG. 23, the attribute of a context is registered in the manner as described below. First, when an attribute is registered from a web context 103, the processing is performed as follows. In response to an attribute registration request, the web context 103 registers the specified attribute (step S171). The web context 103 requests the event listener management module 2011 to notify the event (step S172). The event listener management module 2011 delivers the event to the event listener 2012 registered with the event listener management module 2011, and the SIP context 105 receives the event from the event listener 2012 (step S173)

The SIP context 105 requests the event listener management module 2014 to notify the event (step S174). The event listener management module 2014 delivers the event to the event listener registered with the event listener management module 2014.

When an attribute is registered from a SIP context 105, the processing is performed as follows. In response to an attribute registration request (step S176), the SIP context 105 requests the attribute registration module 2008 on the SIP side to register the attribute (step S177). The attribute registration module 2008 on the SIP side requests the attribute registration module 2003 on the web side to register the attribute (step S178).

The attribute registration module 2003 on the web side requests the web context 103 to register the attribute, and the web context 103 registers the attribute (step S179). The web context 103 requests the event listener management module 2011 to notify the event (step S180).

The event listener management module 2011 delivers the event to the event listener 2012, registered with the event listener management module 2011, and the SIP context 105 receives the event from the event listener 2012 (step S181).

The SIP context 105 requests the event listener management module 2014 to notify the event (step S182). The event listener management module 2014 delivers the event to the event listener registered with the event listener management module 2014 (step S183).

Finally, the deletion of the attribute of a context will be described with reference to FIG. 24. When an attribute is deleted from the web context 103, the processing is performed as follows. In response to an attribute deletion request, the web context 103 deletes the specified attribute (step S201). The web context 103 requests the event listener management module 2011 to notify the event (step S202).

The event listener management module 2011 delivers the event to the event listener 2012 registered with the event listener management module 2011, and the SIP context 105 receives the event from the event listener 2012 (step S203). The SIP context 105 requests the event listener management module 2014 to notify the event (step S204). The event listener management module 2014 delivers the event to the event listener registered with the event listener management module 2014 (step S205).

When an attribute is deleted from the SIP context 105, the processing is performed as follows. In response to an attribute deletion request (step S206), the SIP context 105 requests the attribute deletion module 2009 on the SIP side to delete the attribute (step S207). The attribute deletion module 2009 on the SIP side requests the attribute deletion module 2004 on the web side to delete the attribute (step S208).

The attribute deletion module 2004 on the web side requests the web context 103 to delete the attribute, and the web context 103 deletes the attribute (step S209). The web context 103 requests the event listener management module 2011 to notify the event (step S210).

The event listener management module 2011 delivers the event to the event listener 2012 registered with the event listener management module 2011, and the SIP context 105 receives the event from the event listener 2012 (step S211).

The SIP context 105 requests the event listener management module 2014 to notify the event (step S212). The event listener management module 2014 delivers the event to the event listener registered with the event listener management module 2014 (step S213).

As described above, according to the service providing system in the illustrative embodiment where the SIP-AP server and the web-AP server are loosely coupled, the SIP-AP server environment can be built in the web-AP server environment without modifying the existing web-AP server.

The entire disclosure of Japanese patent application Nos. 2003-371450 and 2004-291716 filed on Oct. 31, 2003 and Oct. 4, 2004, respectively, including the specifications, claims, accompanying drawings and abstracts of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A service providing system comprising:
a first context manager for managing a first context associated with a first protocol, the first context and the first protocol being a web context and a web protocol, respectively, wherein the first context manager comprises a web context cooperation manager;
a second context manager for managing a second context associated with a second protocol, wherein the second context manager comprises a second context cooperation manager, wherein the web context cooperation manager and the second context cooperation manager allow the web context to operate on information managed by the second context and the second context to operate on information managed by the web context;
a first application execution server connected to said first context manager, wherein the first context manager executes a first application associated with the first context, the first application being a web application and wherein the first application execution server is implemented with hardware;
a second application execution server connected to said second context manager, wherein the second context manager executes a second application associated with the second context related to the first context and wherein the second application execution server is implemented with hardware;
a handler manager connected to the first application execution server, the handler manager comprising:
a web protocol handler for receiving a first message via the web protocol from a first client; and
a second protocol handler for receiving a second message via the second protocol from a second client;
the first application execution server comprising:
a first cooperation manager for transmitting the second message to the second application execution server;
a first message processor for processing the first message and the second message, wherein the first message is transmitted to the first application via the first context and the second message is transmitted to the first cooperation manager; and
a first event listener manager for managing an event listener, wherein when an operation is performed on the first context, the event listener notifies the second application execution server of the operation;
the second application execution server comprising:
a second cooperation manager for receiving the second message from the first execution server;
a second message processor for processing the second message, wherein the second message processor transmits the second message to the second application via the second context; and
a connector manager for managing a connector, wherein a second protocol response from the second application is transmitted via the connector manager to the second client.

2. The service providing system in accordance with claim 1, wherein said first application execution server further comprises:
a first context managing subsection for communicating with said first context manager; and
a handler event processor for processing an event from a handler via said handler manager.

3. The service providing system in accordance with claim 2, wherein said second application execution server further comprises:
a second context managing subsection for communicating with said second context manager; and
a connector managing subsection for communicating with said connector manager.

4. The service providing system in accordance with claim 3, wherein said handler manager comprises:
an additional handler event processor for notifying an event to said first application execution server when a handler is added or deleted; and a third message processor for transferring a message between one of the handlers and said first application execution server.

5. A service providing system comprising:
a first context manager for managing a first context associated with a first protocol, the first context and the first protocol being a web context and a web protocol, respectively, wherein the first context manager comprises a web context cooperation manager;
a second context manager for managing a second context associated with a second protocol, wherein the second context manager comprises a second context cooperation manager, wherein the web context cooperation manager and the second context cooperation manager allow the web context to operate on information managed by the second context and the second context to operate on information managed by the web context;
a first application execution server connected to said first context manager for executing a first application associated with the first context, the first application being a web application, wherein the first application execution server is executed with hardware;
a second application execution server connected to said second context manager for executing a second application associated with the second context related to the first context, wherein the second application execution server is executed with hardware;
a handler manager connected to said first application execution server, the handler manager comprising:
an HTTP (Hyper Text Transfer Protocol) handler for passing an HTTP message; and
a second protocol handler for passing a second protocol message;
said first application execution server comprising:
a first cooperation manager for transmitting the second protocol message to the second application execution server;
a first message processor for processing the HTTP message and the second protocol message, wherein the HTTP message is transmitted to the first application via the first context and the second protocol message is transmitted to the first cooperation manager; and
a first event listener manager for managing an event listener, wherein said event listener notifies said second application execution server when an attribute of the first context is one of registered, deleted, or updated; and
said second application execution server comprising:
a second cooperation manager for receiving the second protocol message from the first execution server;
a second message processor for processing the second protocol message, wherein the second message processor transmits the second protocol message to the second application via the second context; and
a connector manager, wherein a second protocol response from the second application is transmitted via the connector manager to a device.

6. The service providing system in accordance with claim 5, wherein said second application execution server comprises a second event listener manager for receiving and managing the event listener.

7. The service providing system in accordance with claim 5, wherein the second protocol handler comprises a second connection manager for generating a connection in response to a request from said second application execution server.

8. The service providing system in accordance with claim 5, wherein said first application execution server further comprises a first context managing subsection for communicating with said first context manager; and a first message deliverer for delivering a message composed according to the first protocol to a corresponding context.

9. The service providing system in accordance with claim 8, wherein said second application execution server comprises a second context managing subsection for communicating with said second context manager; and a second message deliverer for delivering a message composed according to the second protocol to a corresponding context.

10. The service providing system in accordance with claim 5, wherein said handler manager further comprises:
a first handler managing subsection for notifying an event to said first application execution server when the HTTP handler is added or deleted; and
a first message processing subsection for executing message transfer between the HTTP handler and said first application execution server;
a second handler subsection for notifying an event to said second application execution server when the second protocol handler is added or deleted; and
a second message processing subsection for executing message transfer between the second protocol handler and said second application execution server.

11. The service providing system in accordance with claim 1, wherein the second context, the second protocol and the second application are a SIP (Session Initiation Protocol) context, a SIP protocol and a SIP application, respectively.

12. The service providing system in accordance with claim 1, wherein the second context, the second protocol and the second application are an FTP (File Transfer Protocol) context, an FTP protocol and an FTP application, respectively.

13. The service providing system in accordance with claim 3, wherein the second context, the second protocol and the second application are a SIP (Session Initiation Protocol) context, a SIP protocol and a SIP application, respectively.

14. The service providing system in accordance with claim 5, wherein the second context, the second protocol, the second application and the second protocol handler are a SIP (Session Initiation Protocol) context, a SIP protocol, a SIP application and a SIP handler, respectively.

15. A computer implemented method of collaboration between applications available under different protocols, the method comprising:
receiving an HTTP message by a handler manager from a first external device, wherein the handler manager manages an HTTP handler for receiving HTTP messages;
receiving an SIP message by the handler manager from a second external device, wherein the handler manager manages an SIP handler for receiving SIP messages;
processing the SIP message by the SIP handler, wherein processing adds a SIP handler identifier to the SIP message;
transmitting the HTTP message and the SIP message from the handler manager to a web-application execution server, wherein the web-application execution server operates with hardware;
acquiring a web context by an HTTP message processor running on the web-application execution server;
providing the HTTP message from the HTTP message processor to a web application via the web context;
executing the HTTP message by the web application;
transmitting by a first cooperation manager of the web-application execution server the SIP message to a SIP-application execution server, wherein the SIP message is received by a second cooperation manager of the SIP-application execution server and, wherein the SIP-application execution server operates with hardware;
acquiring a SIP connector by a connector manager, wherein the connector manager uses the SIP handler identifier;
acquiring a SIP context by a SIP message processor running on the SIP-application execution server via the SIP connector;
providing the SIP message to a SIP application via the SIP context;
executing the SIP message by the SIP application;
receiving by the SIP-application execution server via the SIP context a first result from the SIP application;
receiving by the web-application execution server via the HTTP context a second result from the web application;
transmitting the second result to the first external device;
requesting a second SIP connection by the SIP-application execution server; and
transmitting the first result to the second external device via the second SIP connection.

16. The method of claim 15, wherein executing the HTTP message by the web application further comprises:
acquiring the SIP application by the web context;
calling the SIP application by the web application; and
retrieving a third result from the SIP application by the web application.

* * * * *